(12) United States Patent
Borisov et al.

(10) Patent No.: US 12,332,459 B2
(45) Date of Patent: Jun. 17, 2025

(54) DIFFRACTIVE OPTICAL ELEMENTS-BASED WAVEGUIDE ARCHITECTURE FOR AUGMENTED REALITY GLASSES WITH WIDE FIELD OF VIEW

(71) Applicant: Samsung Electronics Co., Ltd., Suwon-si (KR)

(72) Inventors: Vladimir Nikolaevich Borisov, St. Petersburg (RU); Aleksandr Evgenyevich Angervaks, St. Petersburg (RU); Nikolay Viktorovich Muravev, Moscow region (RU); Roman Aleksandrovich Okun, St. Petersburg (RU); Gavril Nikolaevich Vostrikov, Moscow (RU); Mikhail Vyacheslavovich Popov, Moscow region (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 502 days.

(21) Appl. No.: 17/883,043

(22) Filed: Aug. 8, 2022

(65) Prior Publication Data

US 2023/0081473 A1 Mar. 16, 2023

Related U.S. Application Data

(63) Continuation of application No. PCT/KR2022/010637, filed on Jul. 20, 2022.

(30) Foreign Application Priority Data

Sep. 13, 2021 (RU) .................... 2021126813

(51) Int. Cl.
G02B 27/42 (2006.01)
G02B 5/18 (2006.01)
G02B 27/01 (2006.01)

(52) U.S. Cl.
CPC ............. *G02B 27/42* (2013.01); *G02B 5/189* (2013.01); *G02B 27/0172* (2013.01)

(58) Field of Classification Search
CPC ................ G02B 27/42; G02B 27/0172; G02B 27/0081; G02B 5/189; G02B 2027/0174; G02B 2027/0125; G02B 2027/0178

(Continued)

(56) References Cited

U.S. PATENT DOCUMENTS 9,874,667 B2 1/2018 Simmonds et al.
9,927,614 B2 3/2018 Vallius
(Continued)

FOREIGN PATENT DOCUMENTS

CN 112817153 A 5/2021
EP 3 828 618 A1 6/2021
(Continued)

OTHER PUBLICATIONS

Russian Office Action dated May 20, 2022, issued in Russian Patent Application No. 2021126813.
(Continued)

*Primary Examiner* — William R Alexander
(74) *Attorney, Agent, or Firm* — Jefferson IP Law, LLP

(57) ABSTRACT

The disclosure relates to augmented reality devices and methods for operating such devices. A waveguide with a diffractive optical elements-based architecture for an augmented reality device is provided. The waveguide includes a light in-coupling zone, a light expanding zone, and a light out-coupling zone. Each zone includes its own set of diffractive optical elements performing the light in-couple, light expand and light out-couple function. There are further provided an augmented reality display device and augmented reality glasses based on the waveguide with the diffractive optical elements-based architecture.

18 Claims, 15 Drawing Sheets

(58) Field of Classification Search
USPC .................................................... 359/207.7
See application file for complete search history.

(56) References Cited

U.S. PATENT DOCUMENTS

| | | | |
|---|---|---|---|
| 10,185,150 | B2 | 1/2019 | Wang et al. |
| 10,185,151 | B2 | 1/2019 | Lee et al. |
| 11,036,046 | B2 | 6/2021 | Valera |
| 11,086,059 | B2 | 8/2021 | Schultz et al. |
| 11,231,612 | B2 | 1/2022 | Oh et al. |
| 11,256,093 | B2* | 2/2022 | Curtis ................ G02B 27/0081 |
| 11,353,641 | B2 | 6/2022 | Tekolste et al. |
| 11,366,317 | B2* | 6/2022 | Blomstedt ............ G02B 6/0035 |
| 11,709,363 | B1* | 7/2023 | Eash .................. G02B 27/0081 |
| | | | 385/37 |
| 11,828,942 | B2* | 11/2023 | Sissom ................ G02B 6/0076 |
| 11,860,366 | B2* | 1/2024 | Eash ................... G02B 6/0056 |
| 11,914,148 | B2* | 2/2024 | Mohammed ....... G02B 27/1066 |
| 12,099,198 | B2* | 9/2024 | Eash ................... G02B 6/0025 |
| 2017/0248750 | A1* | 8/2017 | Curtis ................. G02B 5/22 |
| 2018/0052276 | A1 | 2/2018 | Klienman et al. |
| 2018/0143437 | A1 | 5/2018 | Kimmel et al. |
| 2018/0172981 | A1 | 6/2018 | Ishii |
| 2018/0292653 | A1 | 10/2018 | Tervo |
| 2018/0373115 | A1 | 12/2018 | Brown et al. |
| 2019/0004321 | A1 | 1/2019 | Grey et al. |
| 2019/0179149 | A1* | 6/2019 | Curtis .................... G02B 5/22 |
| 2019/0212557 | A1 | 7/2019 | Waldern et al. |
| 2019/0243142 | A1 | 8/2019 | Tekolste et al. |
| 2020/0041712 | A1 | 2/2020 | Peroz et al. |
| 2020/0081251 | A1* | 3/2020 | Mohammed ......... G02B 27/145 |
| 2020/0110261 | A1 | 4/2020 | Grey et al. |
| 2020/0393674 | A1* | 12/2020 | Blomstedt ............ G02B 6/0035 |
| 2020/0393682 | A1 | 12/2020 | Mason |
| 2020/0408981 | A1* | 12/2020 | Curtis .................. G02B 6/0068 |
| 2020/0409156 | A1* | 12/2020 | Sissom ............. G02B 27/0172 |
| 2021/0109273 | A1 | 4/2021 | Jiang et al. |
| 2021/0215942 | A1 | 7/2021 | Olkkonen et al. |
| 2022/0099978 | A1* | 3/2022 | Eash .................... G02B 27/283 |
| 2022/0214494 | A1 | 7/2022 | Levola et al. |
| 2024/0027773 | A1* | 1/2024 | Eash ................... G02B 6/0038 |

FOREIGN PATENT DOCUMENTS

| | | |
|---|---|---|
| KR | 10-2017-0015942 A | 2/2017 |
| KR | 10-2020-0079274 A | 7/2020 |
| KR | 10-2020-0095509 A | 8/2020 |
| RU | 2 752 296 C1 | 7/2021 |
| WO | 2014/209431 A1 | 12/2014 |
| WO | 2019/005376 A1 | 1/2019 |

OTHER PUBLICATIONS

International Search Report dated Nov. 7, 2022, issued in International Patent Application No. PCT/KR2022/010637.
Extended European Search Report dated Oct. 10, 2024, issued in European Application No. 22867549.2-1001.

* cited by examiner

DIFFRACTIVE OPTICAL ELEMENTS-BASED WAVEGUIDE ARCHITECTURE FOR AUGMENTED REALITY GLASSES WITH WIDE FIELD OF VIEW

CROSS-REFERENCE TO RELATED APPLICATION(S)

This application is a continuation application, claiming priority under § 365(c), of an International application No. PCT/KR2022/010637, filed on Jul. 20, 2022, which is based on and claims the benefit of a Russian patent application number 2021126813, filed on Sep. 13, 2021, in the Russian Intellectual Property Office, the disclosure of which is incorporated by reference herein in its entirety.

FIELD OF THE INVENTION

The disclosure relates to augmented reality devices. More particularly, the disclosure relates to near-eye displays, planar waveguides with diffractive optical elements and displays based on such planar waveguides, and to augmented reality glasses.

DESCRIPTION OF THE RELATED ART

The augmented reality concept is to generate an image where a virtual image is superimposed on a real world scene. User can view the augmented reality scene using augmented reality viewing devices, in particular, augmented reality glasses.

Wearable augmented reality (AR) glasses are a personal device which can be used as additional large screen, e.g. for smartphones or other electronic devices. Average consumers need an AR device with a wide field of view (FOV), which is the angular characteristic showing the range of angles within which virtual images can be observed, and having a low weight, a low cost, a small size, and high resolution. These types of wearable devices can replace a television (TV) and smartphones. The maximum state-of-the art FOV is 60° on the diagonal.

Systems of augmented reality glasses may meet the following guidelines:
  wide field of view, so that the human eye can embrace the entire area seen by it (e.g., the ability of superimposing virtual images on a large area);
  high image quality;
  low weight;
  small size;
  low cost; and
  high resolution, high contrast, etc.

When the guidelines are met, there arise problems associated with, for example, the fact that a wide field of view requires the provision of a wide area within which the eye can observe the entire image completely, without loss. There are different approaches to meeting these guidelines. Some approaches can provide a wide field of view, but are unable to provide a wide area within which the eye can observe the entire image completely, without loss. Other approaches can provide a wide area within which the eye can observe the entire image without loss, but are unable to provide a wide field of view. The classic way to increase the width of the field of view is to increase the number of waveguides in augmented reality devices. However, increasing the number of waveguides results in greater dimensions, larger weight, and decreased resolution of the augmented reality device.

FIG. 1 shows a schematically limitation of the field of view when diffractive optical elements are used in augmented reality devices according to the related art. Referring to FIG. 1, X-axis stands for horizontal field of view (FOV), and Y-axis stands for vertical field of view. Square at the intersection of the X- and Y-axes shows the image to be transmitted to the user for viewing. The transmitted image interacts with a diffractive optical element, which moves the transmitted image to the right (arrow of vector $K_{in}$), and the image falls inside the ring shown in FIG. 1. The ring represents the area of propagating light angular components (the area of components of propagating light wave vectors), which propagate in the waveguide, but do not propagate outside of the waveguide. Angular component is a point on angular grid with angular coordinates, for example, $B_x$, $B_y$, $B_z$. Inner boundary of the ring is the area of the angle of total internal reflection (TIR), i.e., in this case there is a critical angle at which the light propagates without leaving the waveguide. Outer boundary of the ring is the boundary of the light existing inside the waveguide, i.e., in this case, the light propagation angle is 90° inside the waveguide. Thus, inside of the waveguide there is light propagating at angles in the range from the TIR angle to the 90° angle. Therefore, when the image interacts with an in-coupling diffraction grating, part of the image is cut off, since only the image part, which can exist only in the aforementioned range of angles, remains, i.e., in this case the image is cropped in horizontal—at the right and at the left. Further, when interacting with an expanding diffraction element, the vector of which is marked in FIG. 1 as $K_{exp}$, part of the angles is also cut off from the image by the same borders, but vertically. The image remained to display is a small image cropped in vertical and in horizontal.

Therefore, each diffractive optical element introduces its limitation in the field of view, so the less diffractive optical elements are contained in the augmented reality device, the better.

To generate a two-dimensional image, at least three diffractive optical elements: in-coupling diffractive element, expanding diffractive element, and inducing diffractive element, are required. These three diffractive optical elements are referred to herein as a set of diffractive optical elements. FIG. 1 shows one set of diffractive optical elements that outputs a certain portion of the field of view.

The standard way to increase the field of view is to increase the number of waveguides transmitting the image. However, increasing the number of waveguides increases the augmented reality display thickness, weight, and decreases transparency of the augmented reality display. If the waveguide thickness is reduced at the same time, the image perceived by the eye will be worsened, since with decreasing the waveguide thickness more than one image is output to the pupil, due to unevenness and non-flatness of the waveguide itself more than one input image enters the eyes, i.e., ghosting occurs, the resolution drastically reduces, and the image quality worsens.

Furthermore, the field of view is increased by increasing the number of diffractive optical elements. However, each additional diffraction grating on the waveguide makes the waveguide production process more complicated, increasing the time and financial assets for the waveguide manufacture, and increases the cost of the device itself. It should also be noted that whatever the production method, every optical element will have unrecoverable inaccuracies in orientation, period, positioning, and every inaccuracy will result in worsening the image quality.

If the in-coupling diffractive element consists of at least two optical diffraction gratings, the beam diffracted at the first in-coupling grating may diffract at the second diffraction grating. As a result of the double diffraction, the light will not propagate in the direction necessary for correct operation of the device, after interacting with the expanding grating and the out-coupling grating the light will output to the user's eye and create a ghost image.

Furthermore, to increase the field of view, the refractive index of waveguides and materials of diffractive optical elements is increased. Increasing the refractive index increases the range of angles that exist in the waveguide, but not exist in air. Thus, the user sees the image with a large field of view. However, the fundamental problem with this solution is that materials with a high refractive index have absorption in blue region of the spectrum, which means that when the user observes the image, the blue part of the spectrum of the real image is lost, in addition, it is impossible to transmit blue part of the spectrum of the virtual superimposed image, i.e., color of the image is lost.

Also, in related art solutions, the field of view is increased by changing the architecture of planar waveguides, that is, by changing the number of diffractive optical elements, modifying their arrangement and functionality. The most common change is that, instead of using one set of diffractive optical elements, two sets of diffractive optical elements are used, each of the sets providing its own part of the field of view. It should be noted that when two sets are used the field of view width can be increased twofold, but only the vertical field of view increases, while it is preferable to increase both the vertical and horizontal field of view. That is, with this approach, horizontal form factor is lost. The term "form factor" refers to the aspect ratio of the displayed image. Horizontal form factor is an image with a larger horizontal margin than vertical one. Vertical form factor is an image with a vertical margin larger than horizontal one.

Horizontal or vertical form factor implies the aspect ratio of the displayed image. However, if the vertical form factor and the in-coupling diffraction grating are located in relation to the out-coupling diffraction grating, for example, on the left, then with rotation of the waveguide by 90°, the in-coupling diffraction grating will be on top, and the form factor will change from the vertical form-factor to the horizontal one. If the in-coupling diffractive element is on top, then light must also be input into it from above, that is, the image projector must also be attached from above. Thus, the glasses become bulky and more like a helmet.

Therefore, to reduce the dimensions, the image projector shall be advisably positioned on the side with the horizontal form factor maintained.

US 2019/0212557 A1 (publication date Jul. 11, 2019) discloses waveguide architectures.

The related art provides systems and methods for generating head-up displays (HUDs) using waveguides incorporating Bragg gratings. Drawbacks of the related art are small field-of-view width and large dimensions of the device.

US 2019/004321 A1 (publication date Jan. 3, 2019) discloses an optical device for expanding input light in two dimensions in an augmented reality display. The device comprises a waveguide and three linear diffraction gratings. An incident beam from a projector illuminates an input grating with polychromatic light, and the light is coupled into the waveguide. The other two gratings are overlaid on top of one another. Light can be diffracted by one grating into a first diffracted order and towards the other grating which can couple the light out of the waveguide towards a viewer. Drawbacks of the device are small field-of-view width and large dimensions.

U.S. Pat. No. 9,927,614 B2 (publication date Mar. 27, 2018) discloses a near-eye optical display system that may be utilized in augmented reality applications and devices. The system includes a diffractive waveguide having diffractive optical elements (DOEs) configured for in-coupling, exit pupil expansion, and out-coupling. An electrically-modulated tunable liquid crystal (LC) lens is located between the diffraction grating and the eyes of the user. A polarizing filter is located on the other side of the diffraction grating so that light from the real world enters the system with a particular polarization state. Drawbacks include small field-of-view width and large dimensions of the device.

U.S. Pat. No. 9,874,667 B2 (publication date Jan. 23, 2018) discloses a waveguide for a display apparatus, comprising a planar optical waveguide part for guiding light to be displayed, an input diffraction grating to diffract received light along the optical waveguide part for guiding thereby, an intermediate diffraction grating to receive diffracted light from the input diffraction grating and to expand the received light in a first dimension by diffraction, and an output diffraction grating to receive the expanded light and to output the received expanded light from the optical waveguide part by diffraction for display. The input diffraction grating is positioned so as to be located wholly within the area of the intermediate grating, and the grating vectors of the input diffraction grating and the intermediate diffraction grating are oriented in different respective directions. Drawbacks of the waveguide are small field of view, additional mirror, and high production complexity.

U.S. Pat. No. 10,185,150 B2 (publication date Jan. 22, 2019) provides a waveguide display with a small form factor, a wide area within which the eye can see the entire image completely, without loss, and a large field of view. The waveguide display is used for presenting media to a user. The waveguide display includes light source assembly, an output waveguide, and a controller. The light source assembly includes one or more projectors projecting an image light at least along one dimension. The output waveguide includes a waveguide body with two opposite surfaces. The output waveguide includes a first grating receiving an image light propagating along an input wave vector, a second grating, and a third grating positioned opposite to the second grating and outputting an expanded image light with wave vectors matching the input wave vector. The controller controls the scanning of the one or more source assemblies to form a two-dimensional image. However, the display also has small field-of-view width, since it uses only two sets of optical elements to increase the field-of-view width, and large dimensions.

RU 2,752,296 C1 (publication date Jul. 26, 2021) discloses a waveguide with a diffractive optical elements-based architecture for an augmented reality device. The waveguide comprises an in-coupling diffractive element including a first linear diffractive optical element of the in-coupling diffractive element and a second linear diffractive optical element of the in-coupling diffractive element; a first expanding diffractive element and a second expanding diffractive element; and an out-coupling diffractive element. The in-coupling diffractive element is configured to divide an image from the projector into red, green, and blue color image components, and to guide beams of each of the color components through respective set of diffractive elements. The related art provides a full-color image with a wide field of view using a single waveguide, a large field of view and small thickness, and enhances resolution. The drawback of the related art is a large number of optical diffraction gratings, high production complexity, and low brightness of image.

The related art solutions contemplate: a small width of the field of view; increased number of waveguides used implies that the display thickness increases; decreasing the waveguide thickness impairs the resolution; use of a high refractive index results in a loss of chromaticity; use of two sets of diffractive optical elements implies that image is input from above, resulting in the loss of dimension characteristics; and increased number of optical diffraction gratings impairs the image quality and increases the cost of the device.

The disclosure overcomes all of the above problems and ensures a wide field of view with small thickness and full color, high resolution and input of light from the side.

The above information is presented as background information only to assist with an understanding of the disclosure. No determination has been made, and no assertion is made, as to whether any of the above might be applicable as prior art with regard to the disclosure.

SUMMARY OF THE INVENTION

Aspects of the disclosure are to address at least the above-mentioned problems and/or disadvantages and to provide at least the advantages described below. Accordingly, an aspect of the disclosure is to provide a waveguide with a diffractive optical elements-based architecture for an augmented reality device, said diffractive optical elements-based architecture comprising a light in-coupling zone, a light expanding zone, a light out-coupling zone, a first in-coupling/expanding diffractive optical element configured both to in-couple light and to expand light, a second in-coupling/expanding diffractive optical element configured both to in-couple light and to expand light, an in-coupling/out-coupling diffractive optical element configured both to in-couple light and to out-couple light, a first expanding/out-coupling diffractive optical element configured both to expand light and to out-couple light, a second first expanding/in-coupling diffractive optical element configured both to expand light and to out-couple light, wherein the light in-coupling zone comprises a first in-coupling/expanding diffractive optical element performing the light in-couple function, a second in-coupling/expanding diffractive optical element performing the light in-couple function, an in-coupling/out-coupling diffractive optical element performing the light in-couple function, the light expanding zone comprises a second in-coupling/expanding diffractive optical element performing the light expand function, a first in-coupling/expanding diffractive optical element performing the light expand function, a first expanding/out-coupling diffractive optical element performing the light expand function, a second expanding/out-coupling diffractive optical element performing the light expand function, the light out-coupling zone comprises an in-coupling/out-coupling diffractive optical element performing the light out-couple function, a second expanding/out-coupling diffractive optical element performing the light out-couple function, a first expanding/out-coupling diffractive optical element performing the light out-couple function, wherein the light in-coupling zone in configured, in operation of the augmented reality device, to divide the image from the projector into red, green and blue image components, and guiding beam paths of every of the color components through respective set of diffractive optical elements, wherein, listed along the path of light a first set of diffractive optical elements consists of a first in-coupling/expanding diffractive optical element performing the light in-couple function, a second in-coupling/expanding diffractive optical element performing the light expand function, an in-coupling/out-coupling diffractive optical element performing the light out-couple function, a second set of diffractive optical elements consists of a second in-coupling/expanding diffractive optical element performing the light in-couple function, a first in-coupling/expanding diffractive optical element performing the light expand function, an in-coupling/out-coupling diffractive optical element performing the light out-couple function, a third set of diffractive optical elements consists of an in-coupling/out-coupling diffractive optical element performing the light in-couple function, a first expanding/out-coupling diffractive optical element performing the light expand function, a second expanding/out-coupling diffractive optical element performing the light out-couple function, a fourth set of diffractive optical elements consists of an in-coupling/out-coupling diffractive optical element performing the light in-couple function, a second expanding/out-coupling diffractive optical element performing the light expand function, a first expanding/out-coupling diffractive optical element performing the light out-couple function.

Moreover, sum of vectors of all diffractive optical elements in each set is equal to zero.

Moreover, each diffractive optical element is linear.

Moreover, the first set of diffractive optical elements and the second set of diffractive optical elements are configured to transmit central part of the field of view, the third set of diffractive optical elements is configured to transmit upper part of the field of view, the fourth set of diffractive optical elements is configured to transmit lower part of the field of view.

Moreover, all of the diffractive optical elements are applied to one side of the waveguide.

Moreover, diffractive optical elements have a segmented structure, that is, lines are formed as macro-segments of different shape, different size, and spaced apart from each other at different distance.

Moreover, diffractive optical elements are volume, that is, lines are located inside the volume of the waveguide or a layer adjacent to the waveguide.

Moreover, diffractive optical elements comprise one of surface structure, relief structure, or mixed structure, that is, both relief and volume.

Moreover, diffractive optical elements are formed either in the waveguide volume or on the waveguide surface, or both in the waveguide volume and on the waveguide surface.

Moreover, diffractive optical elements are formed in a separate layer of the waveguide, either inside of the layer or on the surface of this layer, or mixed, i.e., part inside, part on the surface of the layer.

Moreover, diffractive optical elements are holographic.

Additional aspects will be set forth in part in the description which follows and, in part, will be apparent from the description, or may be learned by practice of the presented embodiments.

In accordance with an aspect of the disclosure, a method of operating a waveguide with a diffractive optical elements-based architecture according to claim 1 for an augmented reality device is provided. The method includes the operations in which light from a projector falls into a light in-coupling zone, where the light is divided into red image component, blue image component and green image component, and is guided to sets of diffractive optical elements, operating simultaneously, wherein a first set of diffractive optical elements operates as follows blue lower central component is in-coupled to the waveguide by a first in-coupling/expanding diffractive optical element, then is expanded by a second in-coupling/expanding diffractive optical element, and out-coupled to the user's eye by an in-coupling/out-coupling diffractive optical element, green lower central component is in-coupled to the waveguide by a first in-coupling/expanding diffractive optical element, on which its part, propagating at an angle different from the angle of incidence the blue component, diffracts, then is expanded by a second in-coupling/expanding diffractive optical element and out-coupled to the user's eye by an in-coupling/out-coupling diffractive optical element, red lower central component is in-coupled to the waveguide by a first in-coupling/expanding diffractive optical element, on which its part, propagating at an angle different from the angle of incidence of blue and green component, diffracts, then is expanded by a second in-coupling/expanding diffractive optical element and out-coupled to the user's eye by an in-coupling/out-coupling diffractive optical element, a second set of diffractive optical elements operates as follows blue upper central component is in-coupled to the waveguide by a second in-coupling/expanding diffractive optical element, then is expanded by a second in-coupling/expanding diffractive optical element, and out-coupled to the user's eye by an in-coupling/out-coupling diffractive optical element, green upper central component is in-coupled to the waveguide by a second in-coupling/expanding diffractive optical element, on which its part, propagating at an angle different from the angle of incidence of blue component, diffracts, then is expanded by a second in-coupling/expanding diffractive optical element, and out-coupled to the user's eye by in-coupling/out-coupling diffractive optical element, red upper central component is in-coupled to the waveguide by a second in-coupling/expanding diffractive optical element, on which its part, propagating at an angle different from the angle of incidence of blue and green component, diffracts, then is expanded by a second in-coupling/expanding diffractive optical element, and out-coupled to the user's eye by an in-coupling/out-coupling diffractive optical element, a third set of diffractive elements operates as follows, blue lower component is in-coupled to the waveguide by an in-coupling/out-coupling diffractive optical element, then is expanded by a first expanding/out-coupling diffractive optical element and out-coupled to the user's eye by a second expanding/out-coupling diffractive optical element, green lower component is in-coupled to the waveguide by an in-coupling/out-coupling diffractive optical element, on which its part, propagating at an angle different from the angle of incidence of blue component, diffracts, then is expanded by a first expanding/out-coupling diffractive optical element and out-coupled to the user's eye by a second expanding/out-coupling diffractive optical element, red lower component is in-coupled to the waveguide by an in-coupling/out-coupling diffractive optical element, on which its part, propagating at an angle different from the angle of incidence of blue and green component, diffracts, then is expanded by a first expanding/out-coupling diffractive optical element and out-coupled to the user's eye by a second expanding/out-coupling diffractive optical element, a fourth set of diffractive elements operates as follows blue upper component is in-coupled to the waveguide by an in-coupling/out-coupling diffractive optical element, then is expanded by a second expanding/out-coupling diffractive optical element and out-coupled to the user's eye by a first expanding/out-coupling diffractive optical element, green upper component is in-coupled to the waveguide by an in-coupling/out-coupling diffractive optical element, on which its part, propagating at an angle different from the angle of incidence of blue component, diffracts, then is expanded by a second expanding/out-coupling diffractive optical element and out-coupled to the user's eye by a first expanding/out-coupling diffractive optical element, red upper component is in-coupled to the waveguide by an in-coupling/out-coupling diffractive optical element, on which its part, propagating at an angle different from the angle of incidence of blue and green component, diffracts, then is expanded by a second expanding/out-coupling diffractive optical element and out-coupled to the user's eye by a first expanding/out-coupling diffractive optical element.

In accordance with another aspect of the disclosure, a waveguide with a diffractive optical elements-based architecture for an augmented reality device is provided. The diffractive optical elements-based architecture of the waveguide includes a light in-coupling zone, a light expanding zone, a light out-coupling zone, a first diffractive optical element configured to in-couple light, out-couple light and expand light, a second diffractive optical element configured to in-couple light, out-couple light and expand light, wherein the light in-coupling zone comprises a first diffractive optical element performing the light in-couple function, a second diffractive optical element performing the light in-couple function, the light expanding zone comprises a first diffractive optical element performing the light expand function, a second diffractive optical element performing the light expand function, the light out-coupling zone comprises a first diffractive optical element performing the light out-couple function, a second diffractive optical element performing the light out-couple function, wherein the light in-coupling zone in configured, in operation of the augmented reality device, to divide the image from the projector into red, green and blue image components, and guiding beam paths of every of the color components through respective set of diffractive optical elements, wherein, listed along the path of light a first set of diffractive optical elements consists of a second diffractive optical element performing the light in-couple function and the light out-couple function, a first diffractive optical element performing the light expand function, a second set of diffractive optical elements consists of a first diffractive optical element performing the light in-couple function and the light out-couple function, a second diffractive optical element performing the light expand function.

In accordance with another aspect of the disclosure, a method of operating a waveguide with a diffractive optical elements-based architecture according to claim 1 for an augmented reality device is provided. The method includes the operations in which light from a projector falls into a light in-coupling zone, where the light is divided into red image component, blue image component and green image component, and is guided to sets of diffractive optical elements, operating simultaneously, wherein blue upper central component is in-coupled to the waveguide by a second diffractive optical element, then is expanded by a first diffractive optical element, diffracted at a first diffractive optical element and out-coupled to the user's eye by a second diffractive optical element, green upper central component is in-coupled to the waveguide by an element of a second diffractive optical element, on which its part, propagating at an angle different from the angle of incidence the blue component, diffracts, then is expanded by a first diffractive optical element, then is re-diffracted at a second diffractive optical element and out-coupled to the user's eye by second diffractive optical element, red upper central component is in-coupled to the waveguide by a second diffractive optical element, on which its part, propagating at an angle different from the angle of incidence of blue and green component, diffracts, then is expanded by a first diffractive optical element, then is re-diffracted at the first diffractive optical element and out-coupled to the user's eye by the second diffractive optical element.

Another aspect is to provide an augmented reality display device including an image projector, a waveguide with any one of diffractive optical elements-based architectures according to the disclosure.

Another aspect is to provide an augmented reality display device including an image projector, a waveguide with any one of diffractive optical elements-based architectures according to the disclosure.

In accordance with another aspect of the disclosure, an augmented reality display device is provided. The augmented reality display device includes an image projector, a waveguide with any one diffractive optical elements-based architecture according to the disclosure, wherein a first and second sets of diffractive elements are arranged on one side of the waveguide, and a third and fourth sets of diffractive elements are arranged on the other side of the waveguide.

Another aspect is to provide an augmented reality display device including an image projector, at least one waveguide with any one of diffractive optical elements-based architectures according to the disclosure.

Another aspect is to provide augmented reality glasses including a left eye element and a right eye element, each of the left eye element and the right eye element comprising any one augmented reality display device according to the disclosure, wherein the waveguide including a diffractive optical elements-based architecture is arranged in each of the left eye element and right eye element so that light is out-coupled to the user's eyes.

Augmented reality glasses include a left eye element and a right eye element, each of the left eye element and the right eye element comprising any one of the augmented reality display devices according to the disclosure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION OF THE INVENTION

Figure 1:
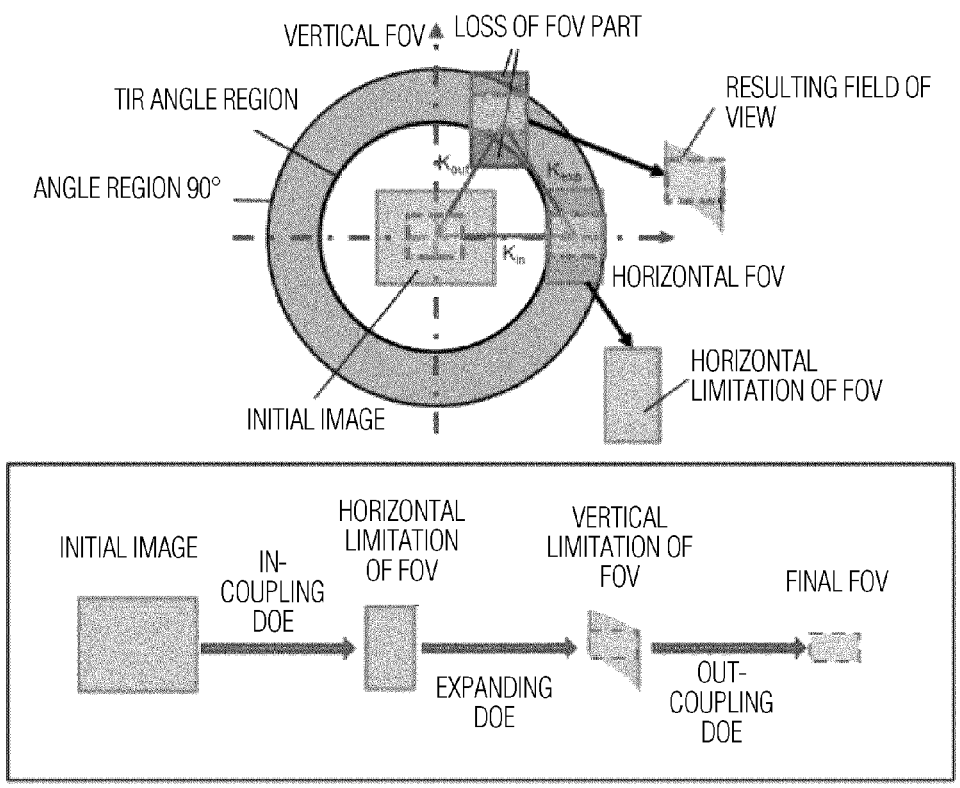
FIG. 1 shows a schematically limitation of a field of view when a set of diffractive optical elements is used according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

There is provided an augmented reality device with a wide field of view and augmented reality glasses made on the basis of the present device.

The disclosure provides a diagonal field of view of more than 80°, solves the problem of double diffraction at in-coupling diffractive element, and ensures a high-quality image due to the absence of double diffraction at the in-coupling diffractive element.

Field of view (i.e., angular field) of an optical system is a cone of rays exiting the optical system and forming images. Center of the field of view corresponds to the center of the image, and edge of the field of view corresponds to edge of the largest possible size of the image.

Augmented reality glasses according to the disclosure comprise a projection system, the waveguide system with diffractive optical elements-based architecture (i.e., structure).

To enable operation of a device based on holographic optical elements (HOE) or diffractive optical elements (DOE) and output an image to the human eye, the image transmitted from the projector should sequentially interact with at least three linear diffraction gratings, particularly: an in-coupling diffraction grating; an expanding diffraction grating; and an out-coupling diffraction grating. It should be noted that the expanding element is necessary for each angular component of the image-generating light to propagate inside the waveguide not only along the axis corresponding to the direction of the in-coupling diffraction grating vector, but also along the perpendicular direction. Thus, when light is out-coupled at the out-coupling diffraction grating, it will be out-coupled from a large-area region, thereby providing a wide region within which the eye can observe the entire image completely, without loss.

Figure 2A:
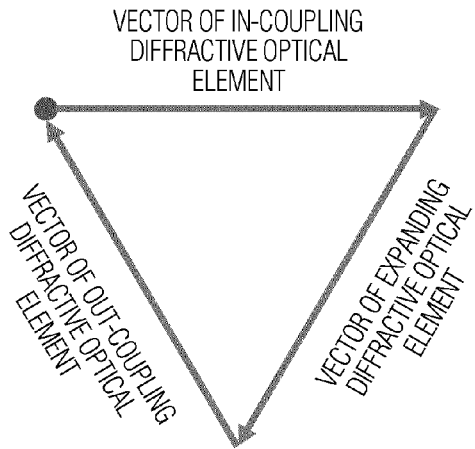
FIG. 2A is a vector diagram of a set of diffraction gratings according to an embodiment of the disclosure.

Diffraction grating vector is a wave vector of the diffraction grating, oriented perpendicular to the grating lines and located in the same plane with its working surface. Diffractive optical element vector is perpendicular to the plane of the diffractive optical element, that is, perpendicular to lines of the diffraction grating. Diffraction grating vector is determined by length and orientation in space. Vector length is $|\vec{K}|=2\pi/\Lambda$, where $\Lambda$ is the spatial period of the diffraction grating. If we consider diffractive optical gratings in the form of vectors of the gratings, then, to obtain an undistorted image, vectors of three diffraction gratings (in-coupling, expanding, and out-coupling) should form an enclosed two-dimension figure, as shown in FIG. 2A, that is, the sum of all vectors must be zero. If the sum of vectors is not zero, the image will be displayed with distortions. If the three vectors do not form a two-dimensional figure, the input wide field of view create a narrow picture on the output, which is not quite comfortable to observe, because with the eye pupil looking forward, only the central field of the image is clearly visible, while the edge parts of the image represent a dark area, and with the pupil offset in the vertical direction, on the contrary, the central part will appear as a dark area. Therefore, in classical systems the user can see only a narrow strip of the image according to the related art. Since it is initially assumed that dimensions of the transmitted image coincide with the field of view of the waveguide, the field of view coincides with the image field.

According to the disclosure, five diffractive optical elements are arranged on one waveguide to make up four sets of diffractive optical elements.

FIG. 2A shows a vector diagram of one set of diffraction gratings, comprising an in-coupling diffraction grating, an expanding diffraction grating, and an out-coupling diffraction grating according to an embodiment of the disclosure.

Figure 2B:
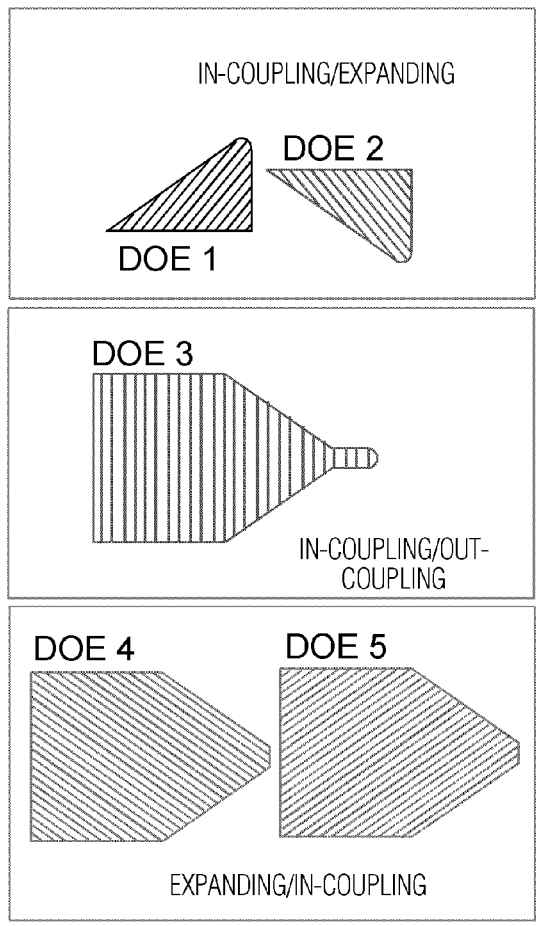
FIG. 2B shows a shape of diffractive optical elements used to form an architecture and arrangement of their lines according to an embodiment of the disclosure.

FIG. 2B shows a shape of diffractive optical elements used to form diffractive optical elements-based architecture for an augmented reality device, and an arrangement of their lines according to an embodiment of the disclosure.

Referring to FIGS. 2A and 2B, the illustrated shape is a shape of optical diffraction gratings, and may vary depending on a setting of system parameters: field of view; image output area; refractive index of the system; etc. The shape of gratings shown in FIG. 2B is an empirically found shape of gratings, close to optimal, based on specific parameters of the system. DOE1 is a first in-coupling/expanding diffractive optical element, DOE2 is a second in-coupling/expanding diffractive optical element, these elements can perform the function of both light in-coupling and light expanding, and DOE1 and DOE2 form in-coupling/expanding diffractive element X.

DOE3 is an in-coupling/out-coupling diffractive optical element, it can perform the function of both light in-coupling, and light out-coupling, and DOE3 forms in-coupling/out-coupling diffractive element Y.

DOE4 is a first expanding/out-coupling diffractive optical element, DOE5 is a second expanding/out-coupling diffractive optical element, these elements can perform the function of both light expanding, and light out-coupling, and DOE4 and DOE5 form expanding/out-coupling diffractive element Z.

Therefore, each diffractive optical element can perform two functions, thereby decreasing the number of diffractive optical elements, but the number of sets of diffractive optical elements remains, that is, the cost of manufacturing the device decreases, and the image quality increases due to the decreased number of diffractive optical elements, particularly, brightness of the image increases, and parasitic images are eliminated. The waveguide architecture of the disclosure enables increasing the width of the field of view.

Consider sets of diffractive elements, each of which, according to the disclosure, works to output a separate part of an image (i.e., field of view) in operation of the present waveguide with a diffractive optical elements-based architecture for an augmented reality device.

Set 1 of diffractive elements consists of (listed along the path of light):
 a first in-coupling/expanding diffractive optical element performing the light in-couple function;
 a second in-coupling/expanding diffractive optical element performing the light expand function; and
 an in-coupling/out-coupling diffractive optical element performing the light out-couple function;

Set 2 of diffractive elements consists of (listed along the path of light):
 a second in-coupling/expanding diffractive optical element performing the light in-couple function;
 a first in-coupling/expanding diffractive optical element performing the light expand function; and
 an in-coupling/out-coupling diffractive optical element performing the light out-couple function.

Set 3 of diffractive elements consists of (listed along the path of light):
 an in-coupling/out-coupling diffractive optical element performing the light in-couple function;
 a first expanding/out-coupling diffractive optical element performing the light expand function; and a second expanding/out-coupling diffractive optical element performing the light out-couple function.

Set 4 of diffractive elements consists of (listed along the path of light):
- an in-coupling/out-coupling diffractive optical element performing the light in-couple function;
- a second expanding/out-coupling diffractive optical element performing the light expand function; and
- a first expanding/out-coupling diffractive optical element performing the light out-couple function.

To avoid double diffraction, the region in which light is in-coupled to the waveguide consists of three diffractive optical elements: a first in-coupling/expanding diffractive optical element, a second in-coupling/expanding diffractive optical element, an in-coupling/out-coupling diffractive optical element. Here, sum of vectors of the first and second diffractive optical elements is equal to the vector of the third diffractive optical element; only so the appearance of ghost images can be avoided. In this case, the effect of double diffraction of light on the first and second diffractive optical elements will be equivalent to the effect of diffraction on the third diffractive optical element, that is, the light diffracted by the first diffractive optical element and then immediately by the second diffractive optical element (or vice versa) will propagate in the waveguide in the same direction as if it was diffracted by the third diffractive optical element.

Figure 2C:
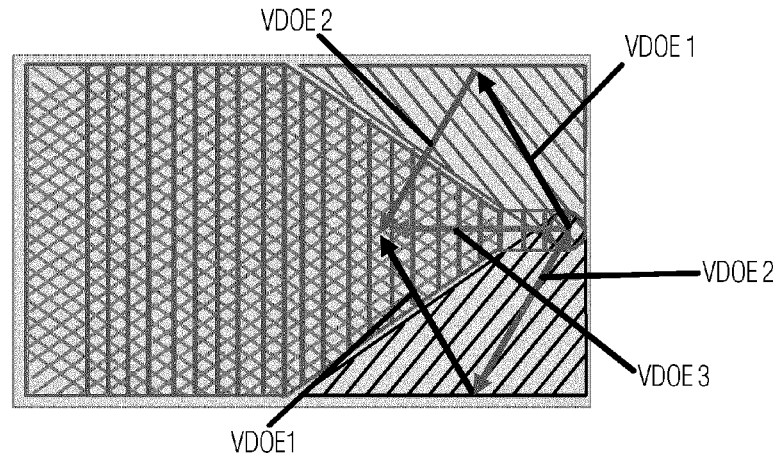
FIG. 2C shows a diffractive optical elements-based architecture according to the disclosure with overlaid vectors of in-coupling diffractive elements according to an embodiment of the disclosure.

FIG. 2C is a schematic view of diffractive optical elements-based architecture with overlaid vectors of diffractive optical elements intended for in-coupling according to an embodiment of the disclosure.

Referring to FIG. 2C, VDOE1 is a vector of a first in-coupling/expanding diffractive optical element, VDOE2 is a vector of a second in-coupling/expanding diffractive optical element, and VDOE3 is a vector of an in-coupling/out-coupling diffractive optical element. As seen, the sum of vectors VDOE1 and VDOE2 is equal to vector VDOE3.

Figure 2D:
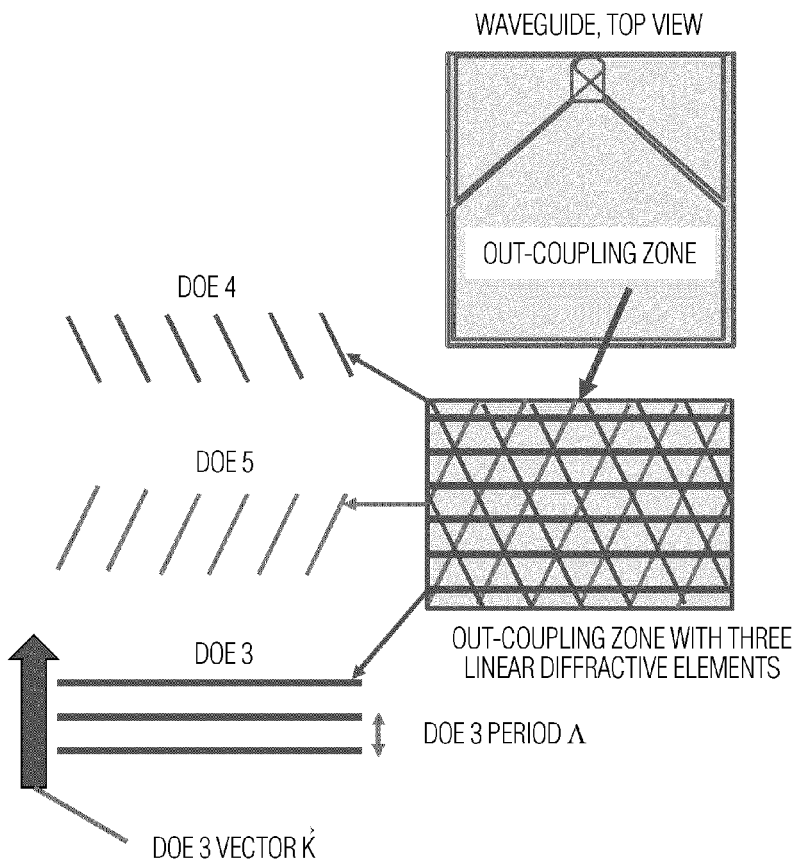
FIG. 2D is a waveguide with an architecture according to the disclosure and a more detailed illustration of an out-coupling zone of the waveguide according to an embodiment of the disclosure.

FIG. 2D illustrates a waveguide with the architecture of the disclosure and, in more details, a waveguide out-coupling zone comprising three diffractive optical elements (DOE3, DOE4, DOE5), where each diffractive element has its own period (distance between adjacent lines) and orientation, and can be uniquely described by diffraction grating vector. Referring to FIG. 2D, vector $\vec{K}$ corresponds to in-coupling/out-coupling diffractive optical element DOE3. Vector of the in-coupling/out-coupling diffractive optical element DOE3 is oriented perpendicular to lines of the in-coupling/out-coupling diffractive optical element DOE3. Vector of each diffractive optical element will be oriented perpendicular to lines of this diffractive optical element.

Figure 3:
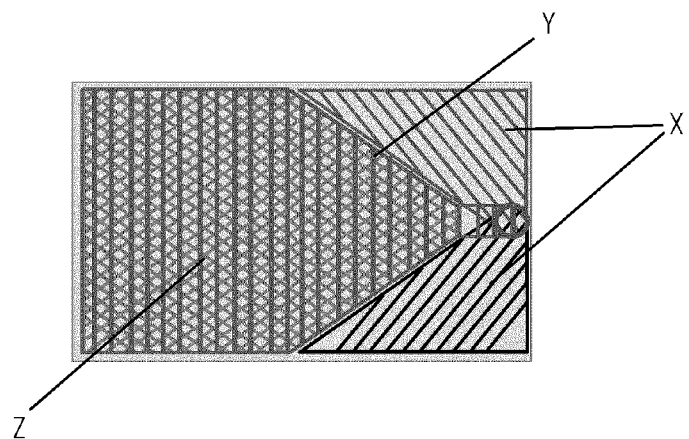
FIG. 3 is a diffractive optical elements-based architecture according to an embodiment of the disclosure.

FIG. 3 is a diffractive optical elements-based architecture according to an embodiment of the disclosure.

Referring to FIG. 3, the diffractive optical elements-based architecture consists of:
- an in-coupling/expanding diffractive element X configured to in-couple image light from the image projector to the waveguide body from two directions and expand light. In-coupling/expanding diffractive element X, as stated above, includes first and second in-coupling/expanding diffractive optical elements DOE1 and DOE2 (see FIG. 2B);
- an in-coupling/out-coupling diffractive element Y including, as stated above, an in-coupling/out-coupling diffractive optical element DOE3 (see FIG. 2B), configured to in-couple image light from the image projector to the waveguide body in the direction parallel to the direction of light expanded by the in-coupling/expanding element X and to out-couple the light expanded at the in-coupling/expanding element X, i.e., to out-couple the light expanded at the in-coupling/expanding diffractive element X; and
- an expanding/out-coupling diffractive element Z configured to expand the light which is in-coupled on in-coupling/out-coupling diffractive element Y, in two directions, and to out-couple the light towards the user eyes. Expanding/out-coupling diffractive element Z includes first expanding/out-coupling diffractive optical element DOE4 and second expanding/out-coupling diffractive optical element DOE5 (see FIG. 2B).

It should be noted that the first in-coupling/expanding diffractive optical element, second in-coupling/expanding diffractive optical element, in-coupling/out-coupling diffractive optical element, first expanding/out-coupling diffractive optical element and second expanding/out-coupling diffractive optical element are linear diffractive optical elements, that is, they are uniquely described by one parameter—the diffraction grating vector.

Figure 4:
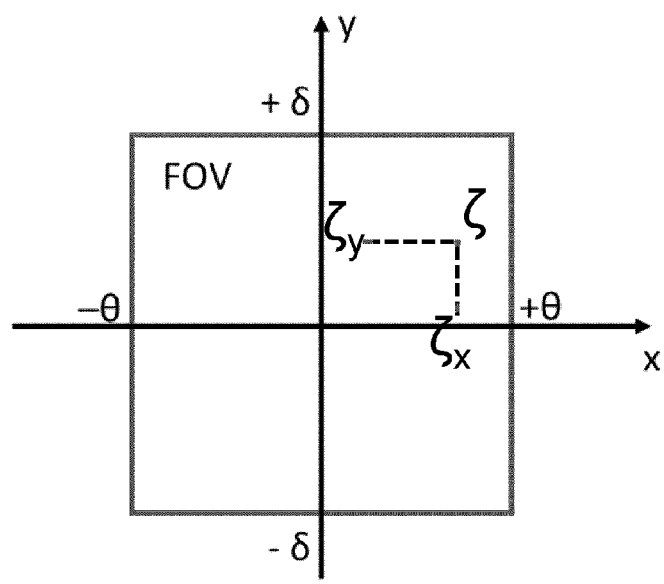
FIG. 4 represents a field of view in two-dimensional coordinates according to an embodiment of the disclosure.

FIG. 4 represents a field of view in two-dimensional coordinates according to an embodiment of the disclosure.

Waveguide is designed using parameters of diffractive elements, particularly, using spatial orientation of diffractive elements and spatial period of the diffractive elements, which are described by the diffractive optical element vector. Field of view of the optical system is defined by spectral characteristics and angular characteristics, i.e., angular dimensions in horizontal and in vertical. FIG. 4 shows horizontal field of view (FOV) on X-axis and vertical field of view (FOV) on Y-axis. Vertical size of the field of view is $2\delta$, i.e., from $-\delta$ to $+\delta$, and horizontal size of the field of view is $2\theta$, i.e. from $-\theta$ to $+\theta$. Light source (e.g., a projector) has three basic wavelengths: $\lambda_r$ for red color, $\lambda_g$ for green color, and $\lambda_b$ for blue color. That is, necessary parameters of diffractive elements can be calculated analytically.

Referring to FIG. 4, field of view of an optical system is a cone of rays with different angles and wavelengths. We will consider each ray as a field of view component, and describe it in terms of its wave vectors. Wave vector of electromagnetic wave $k_\lambda$, $\zeta_x$, $\zeta_y$ is defined by three coordinates $\lambda$, $\zeta_x$, and where $\lambda$ is length of electromagnetic wave, $\zeta_x$ is angular coordinate of electromagnetic wave in direction x, and $\zeta_y$ is angular coordinate of electromagnetic wave in direction y. We can find components x, y, z of wave vector, i.e., wave vector components on x, y, z axes of spatial basis, which can be chosen arbitrarily, but in calculation of waveguide structures, x, y axes are commonly chosen along the long edges of the waveguide, and z axis is chosen along the short edge of the waveguide. Determination of the wave vector components in the waveguide basis enables transition from angular characteristics, which are more understandable for user, to characteristics of wave vectors, which are much easier to use for calculating the waveguide architecture by following equation:

Equations 1 and 2

$$(k_{\lambda,\zeta_x,\zeta_y})_x = \text{sgn}(\zeta_x)\sin\left(\tan^{-1}\left(\sqrt{\tan^2(\zeta_x)+\tan^2(\zeta_y)}\right)\right) * \frac{2\pi n}{\lambda} * \sin\left(\tan^{-1}\left(\frac{\tan(\zeta_x)}{\tan(\zeta_y)}\right)\right) \quad (1)$$

$$(k_{\lambda,\zeta_x,\zeta_y})_y = \quad (2)$$

-continued $$\text{sgn}(\zeta_y)\sin\left(\tan^{-1}\left(\sqrt{\tan^2(\zeta_x)+\tan^2(\zeta_y)}\right)\right)*\frac{2\pi n}{\lambda}*\cos\left(\tan^{-1}\left(\frac{\tan(\zeta_x)}{\tan(\zeta_y)}\right)\right)$$

Equation 3

$$(k_{\lambda,\zeta_x,\zeta_y})_z = \sqrt{\left(\frac{2\pi n}{\lambda}\right)^2 - (k_{\lambda,\zeta_x,\zeta_y})_x^2 - (k_{\lambda,\zeta_x,\zeta_y})_y^2} \quad (3)$$

n is refractive index of the medium in which light propagates.

Diffraction is described by the law of conservation of momentum:

$$\vec{k_i}+\vec{K}=\vec{k_d} \quad (4)$$

where $\vec{k_i}$ is the vector of incident wave, $\vec{k_d}$ is the wave vector of diffracted wave, $\vec{K}$ and is the vector of diffraction grating.

$$(k_{\lambda,i_x,i_y})_x + K_x = (k_{\lambda,d_x,d_y})_x \quad (5)$$

$$(k_{\lambda,i_x,i_y})_y + K_y = (k_{\lambda,d_x,d_y})_y \quad (6)$$

Equations 5 and 6 are decompositions of Equation (4) to components x and y. Index i stands for incident wave, index d stands for diffracted wave.

Besides that, the law of conservation of momentum must be obeyed:

$$\sqrt{(k_{\lambda,d_x,d_y})_x^2 + (k_{\lambda,d_x,d_y})_y^2} \leq \frac{2\pi n}{\lambda} \quad \text{Equation 7}$$

Equation 7 imposes restrictions on possible x- y-components of diffracted wave, taking into account the law of conservation of momentum: length of x- y-projection of diffracted wave vector (left side of the equation) must be less than or equal to the length of diffracted wave vector (right side of the equation). If Equation 7 is not observed, then diffraction is impossible and the wave vector does not change. Besides that, wave vector in the waveguide must also obey the total internal reflection (TIR) condition:

Equation 8

$$\sqrt{(k_{\lambda,d_x,d_y})_x^2 + (k_{\lambda,d_x,d_y})_y^2} > \frac{2\pi}{\lambda} \quad (8)$$

Equation 8 imposes a restriction on possible vectors of the diffracted wave, which can propagate inside the waveguide under the TIR condition: to enable propagation of the diffracted wave inside the waveguide under the TIR condition, the x-y-projection length of the diffracted wave vector (left side of the equation) must be greater than the length of the vector of the wave propagating at the critical TIR angle (the right side of the equation).

Combining Equations 7 and 8, we got numerical condition for determining whether the diffracted wave can propagate inside the waveguide under the TIR condition:

Equation 9

$$\frac{2\pi}{\lambda} < \sqrt{(k_{\lambda,d_x,d_y})_x^2 + (k_{\lambda,d_x,d_y})_y^2} \leq \frac{2\pi n}{\lambda} \quad (9)$$

Figure 5:
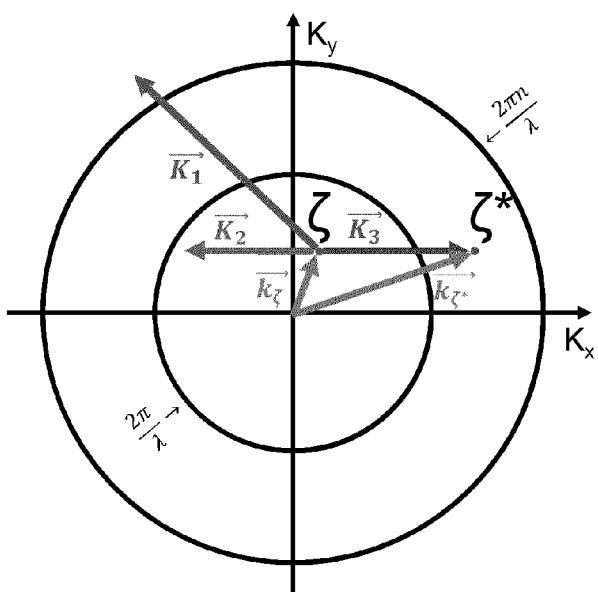
FIG. 5 illustrates a diffraction phenomenon in a space of wave vectors through an example with three diffractive elements according to an embodiment of the disclosure.

FIG. 5 illustrates a diffraction phenomenon in the space of wave vectors through the example with three diffractive elements according to an embodiment of the disclosure.

Referring to FIG. 5, there is shown three examples of the result of diffraction of initial wave $\vec{k_\zeta}$ on three diffraction gratings $\vec{K_1}$, $\vec{K_2}$, $\vec{K_3}$, in the space of wave vectors on the Ewald diagram; x-y-components of the wave vectors are plotted along the axes, vectors of diffraction gratings differ from each other both in length and direction. They are taken as an example to illustrate three cases of diffraction, only one of which will satisfy the Equation 9. Inner circle corresponds to critical TIR angle, outer circle corresponds to the angle of 90 degrees inside the waveguide. In case of diffraction on grating $\vec{K_1}$, the length of x- y-projection of diffracted wave vector will be greater than the length of diffracted wave vector, which contradicts Equation 7, hence, such wave vector will not exist (diffraction will not occur).

In the case of diffraction on grating $\vec{K_2}$ the length of x-y-projection of diffracted wave vector is less than the length of vector of the wave propagating at the critical TIR angle, which contradicts Equation 8, hence, the diffracted wave will not propagate in the waveguide under the TIR condition. Only in the case of diffraction on grating $\vec{K_3}$ diffracted wave $\vec{k_\zeta}$, will satisfy Equation 9, hence, will propagate inside the waveguide under the TIR condition.

To calculate parameters of all gratings of the present architecture, the following basic initial prerequisites are to be taken into account:

1. The law of conservation of momentum in vector form to calculate the diffraction (Equation 4).

2. Vectors of all sets of diffraction gratings must form an enclosed two-dimensional figure, hence, the sum of vectors in each set must be equal to zero. Otherwise, the vector of the wave emerging from the waveguide towards the user's eye will differ from the vector of the wave incident on the wave in-coupling element by an addition equal to the sum of the vectors. Since the wave vector length depends on the light wavelength, the same addition to the wave vector will give a different addition to the light propagation angle depending on the wavelength, which will result in chromatic aberrations.

3. Restriction on the diffracted wave vectors, which can propagate in the waveguide under TIR condition (Equation 9).

4. Geometrical properties of the architecture, based on the propagation of light in the waveguide, this item determines the shape and arrangement of diffraction gratings.

5. The condition that double diffraction is impossible on the gratings located in the same region of the waveguide if these gratings belong to different sets.

Taking into account these prerequisites, parameters of all diffraction gratings of the architecture can be exactly calculated using initial parameters (e.g., waveguide dimensions, refractive index of the waveguide, etc.) and technical requirements (e.g., field of view, size of the area of lossless image output, etc.).

Figure 6:
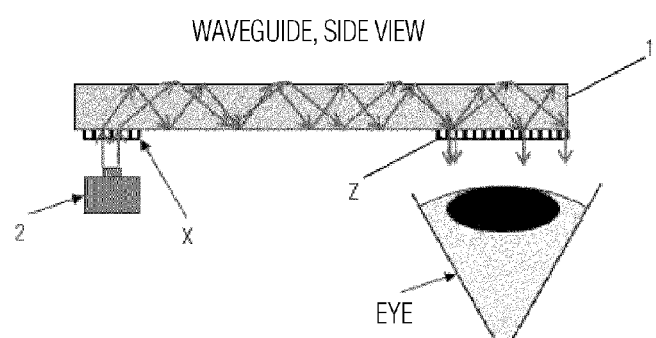
FIG. 6 is a schematic view of an augmented reality display system according to an embodiment of the disclosure.

FIG. 6 is a schematic illustration of an augmented reality display system according to an embodiment of the disclosure.

Referring to FIG. 6, the present system consists of at least one waveguide 1 including the diffractive optical elements-based architecture described above, and an image-generating projector 2.

An image generated by the projector 2 is coupled to the diffractive elements-based architecture by in-coupling/expanding diffractive element X and in-coupling/out-coupling diffractive element Y, propagates over the architecture of diffractive elements in the waveguide, passes through diffractive optical elements, one of functions of which is to expand light, exits diffractive optical elements, one of functions of which is to out-couple light, and enters the user's eye.

The principle of operation of diffractive optical elements, which perform the function of expansion, according to the related art is as follows. A beam propagating inside the waveguide falls on the expanding diffractive element and part of light of this beam diffracts on the expanding diffractive element, forming diffraction orders; in this case "+1" diffraction order is considered. A beam that passed non-diffracted continues propagating along its original path, and after re-reflection from the waveguide planes falls again on the expanding diffractive element, and part of light of this beam again diffracts on the expanding grating, forming "+1" diffraction order. Then the situation is repeated many times. The diffracted and re-diffracted beams are parallel to each other, but propagate at a fixed distance from each other. Thus, multiple parallel beams are obtained from one beam, i.e., expansion occurs.

Consider sets of diffractive elements, which, according to the disclosure, function to output separate portions of the image (i.e., field of view) in operation of the present waveguide architecture.

Figure 7A:
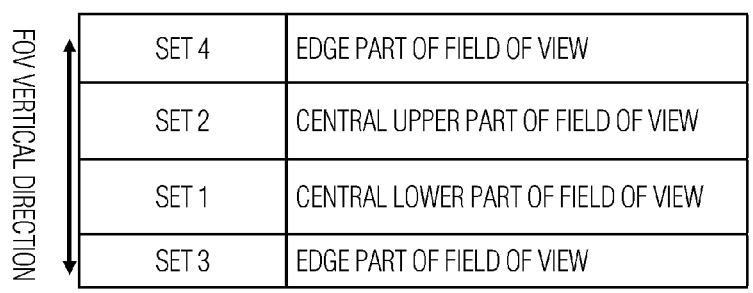
FIG. 7A is an arrangement of sets of diffractive optical elements, each of which is responsible for its own part of a field of view in vertical according to an embodiment of the disclosure.

FIG. 7A is an arrangement of sets of diffractive optical elements, each of which is responsible for its own part of the field of view in vertical according to an embodiment of the disclosure.

Referring to FIG. 7A, each part of the field of view is formed by its own set of diffractive optical elements, in other words, a certain set of diffractive elements is responsible for displaying a specific part of the field of view. In particular, set 1 is responsible for the central lower part of the field of view, set 2 is responsible for the central upper part of the field of view, set 3 is responsible for the lower part of the field of view, and set 4 is responsible for the upper part of the field of view, respectively.

The present device works as follows.

Light from the projector falls on the waveguide to the light in-coupling zone, where it diffracts on diffraction elements: a first in-coupling/expanding (DOE1), a second in-coupling/expanding (DOE2) and an in-coupling/out-coupling diffractive optical element (DOE3), and is also divided at different angles into red, green, and blue components.

Set 1, comprising DOE1, DOE2 and DOE3, operates as follows.

Blue central low component is in-coupled to the waveguide by DOE1, then is expanded by DOE2 and out-coupled to the user's eye by DOE3.

Green central lower component is in-coupled to the waveguide by DOE1, on which the part of it, which propagates in air at an angle different from the angle of incidence of blue component, diffracts, then is expanded by DOE2 and out-coupled to the user's eye by DOE3.

Red central lower component is in-coupled to the waveguide by DOE1, on which the part of it, which propagates in air at an angle different from the angle of incidence of blue component and green component, diffracts, then is expanded by DOE2 and out-coupled to the user's eye by DOE3.

Set 2, comprising DOE2, DOE1, and DOE3, works as follows.

Blue upper central component is in-coupled to the waveguide by DOE2, then is expanded by DOE1 and out-coupled to the user's eye by DOE3.

Green upper central component is in-coupled to the waveguide by DOE2, on which the part of it, which propagates in air at an angle different from the angle of incidence of blue component, diffracts, then is expanded by DOE1 and out-coupled to the user's eye by DOE3.

Red upper central component is in-coupled to the waveguide by DOE2, on which the part of it, which propagates in air at an angle different from the angle of incidence of blue component and green component, diffracts, then is expanded by DOE1 and out-coupled to the user's eye by DOE3.

Set 3, comprising DOE3, DOE4, and DOE5, works as follows.

Blue lower component is in-coupled to the waveguide by DOE3, then is expanded by DOE4 and out-coupled to the user's eye by DOE5.

Green lower component is in-coupled to the waveguide by DOE3, on which the part of it, which propagates in air at an angle different from the angle of incidence of blue component, diffracts, then is expanded by DOE4 and out-coupled to the user's eye by DOE5.

Red lower component is in-coupled to the waveguide by DOE3, on which the part of it, which propagates in air at an angle different from the angle of incidence of blue component and green component, diffracts, then is expanded by DOE4 and out-coupled to the user's eye by DOE5.

Set 4, comprising DOE3, DOE5, and DOE4, works as follows.

Blue top is in-coupled to the waveguide by DOE3, then is expanded by DOE5 and out-coupled to the user's eye by DOE4.

Green upper component is in-coupled to the waveguide by DOE3, on which the part of it, which propagates in air at an angle different from the angle of incidence of blue component, diffracts, then is expanded by DOE5 and out-coupled to the user's eye by DOE4.

Red upper component is in-coupled to the waveguide by DOE3, on which the part of it, which propagates in air at an angle different from the angle of incidence of blue component and green component, diffracts, then is expanded by DOE5 and out-coupled to the user's eye by DOE4.

Figure 7B:
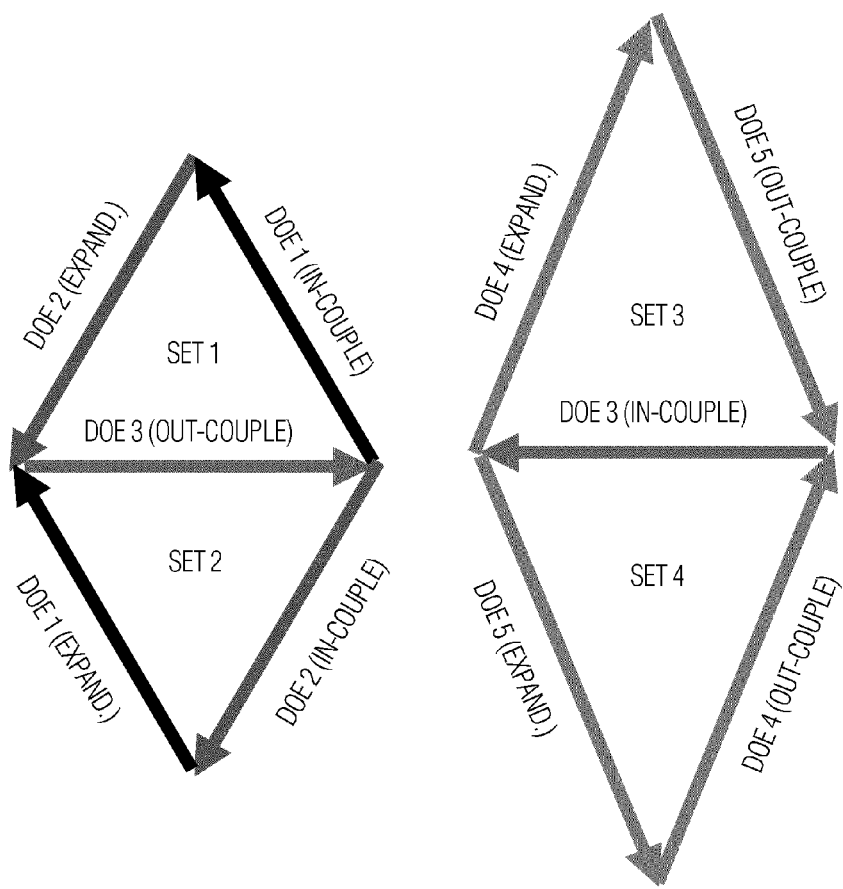
FIG. 7B shows vector diagrams of sets of diffractive elements according to an embodiment of the disclosure.

FIG. 7B shows vector diagrams of sets of diffractive elements according to an embodiment of the disclosure.

Vectors of each set of diffractive optical elements should have the shape of enclosed two-dimensional figure, so vectors of the four sets are arranged in four triangles. Since the architecture has symmetry, the sets can be split in pairs (in each pair of sets, one triangle is oriented upward, the other is oriented downward). In order for pairs of sets to transmit different parts of the field of view in vertical direction, it is necessary that lengths of vectors of different sets, having a nonzero vertical component, differ from each other, for this reason the triangles have different height. The provisions described above are general for this architecture, and all other details of arrangement of vectors are particular examples.

Four sets of diffractive elements are used on a single waveguide to increase the width of the field of view by partially separating different sets of diffractive elements in direct space. It should be noted that herein the terms "direct space" and "angular space" define the coordinate grid in which the analysis/calculation is performed. In direct space, the grid is defined by spatial coordinates (x, y, z directions). In angular space, the grid is defined by angular coordinates (e.g. Ax, Ay, Az). The disclosure takes into account not only the direction of propagation of light (angular space), but also those places inside the waveguide where this light propagates (direct space). To prevent mixing of all parts of the image field, it is necessary that at each specific point in space inside the waveguide one point on the grid of angular coordinates occupies no more than one part of the transmitted image. This can be achieved by strictly prohibiting the use of more than one part of the transmitted image at the same point on the grid of angular coordinates, this approach is widely used in the related art. In the disclosure, the same point on the grid of angular coordinates can occupy more than one part of the transmitted image, since different parts of the transmitted image occupy the same point on the grid of angular coordinates in different places inside the waveguide, that is, they are separated in direct space.

This configuration avoids the appearance of a ghost image resulting from double diffraction on the in-coupling element.

Figure 8:
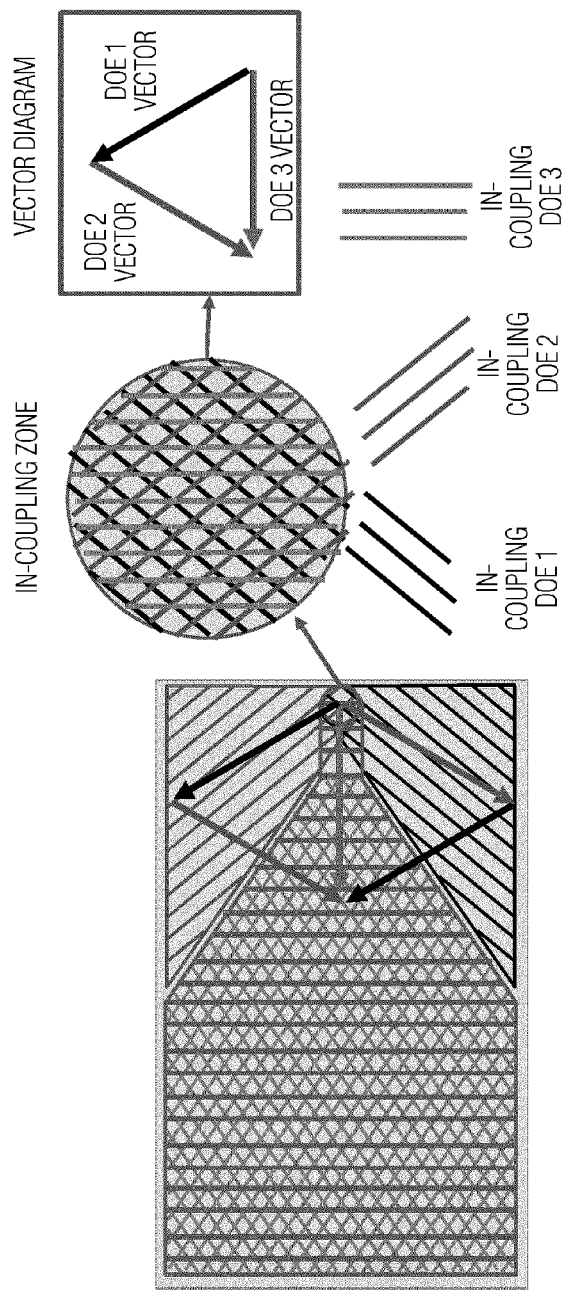
FIG. 8 is a schematic view of a diffractive elements-based architecture according to the disclosure and an in-coupling/expanding diffractive element X with three diffractive optical elements according to an embodiment of the disclosure.

FIG. 8 is a schematic view of present diffractive elements-based architecture and an embodiment of a light in-coupling zone having three diffractive optical elements according to an embodiment of the disclosure.

Referring to FIG. 8, the in-coupling zone comprises a first in-coupling/expanding diffractive optical element (DOE1) performing the light in-couple function, a second in-coupling/expanding diffractive optical element (DOE2) performing the light in-couple function, an in-coupling/out-coupling diffractive optical element (DOE3) performing the light in-couple function. Light is in-coupled to the part, in which the first element, second element and third element are overlaid on one another. Lines of the diffractive optical elements intersect, as shown in FIG. 8. Sum of vectors of DOE1 and DOE2 is equal to vector of the third element. Due to this, if the light diffracts at DOE1 and then diffracts at DOE2, the resulting direction of the obtained light will coincide with the direction of the light diffracted at DOE3, due to this, the light that has undergone double diffraction will not create a ghost image, on the contrary, it will increase brightness of the resulting image.

Figure 9:
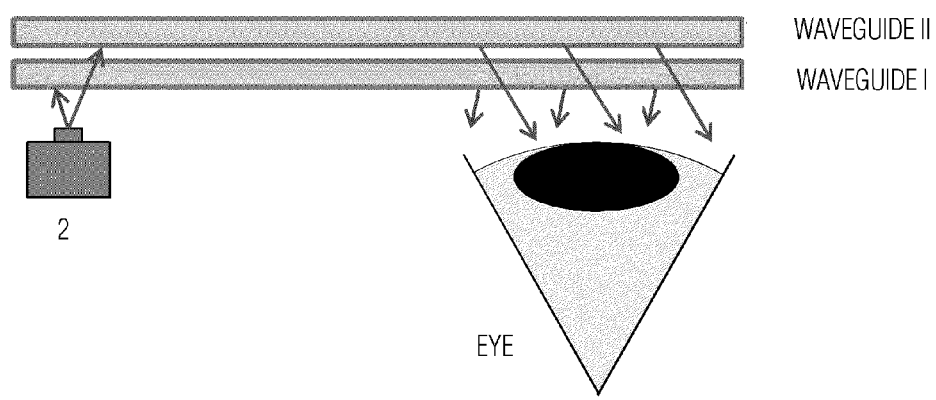
FIG. 9 illustrates a two-waveguide system according to an embodiment of the disclosure.

FIG. 9 illustrates the use of a two-waveguide system according to an embodiment of the disclosure.

Referring to FIG. 9, the two-waveguide system can be used to increase the width of the field of view. Diffractive elements-based architectures of each of the system waveguides repeat each other, each of the two waveguides being designed to display its own spectral-angular part of the field of view.

The two-waveguide system will work as follows. Light from the projector falls on waveguide I at a light in-coupling zone, where it diffracts at diffraction elements DOE1, DOE2, and DOE3, and is also divided at different angles into red, green, and blue components. Central inner part of blue field of view, inner part of green field of view and edge inner part of red field of view are transmitted through waveguide I. It should be clarified that different color parts of the field of view are transmitted due to chromatic dispersion of any diffractive element. The order is also valid for any diffractive element. The terms "inner part of the field of view" and "outer part of the field of view" refer to the ranges of angles transmitted by the waveguide. Inner part of the field of view is the part of the field of view with predominantly negative angles, while outer part of the field of view is the part of the field of view with predominantly positive angles.

Set 1 of waveguide I, comprising elements DOE1, DOE2 and DOE3, works as follows.

Blue lower central component is in-coupled to the waveguide by DOE1, then is expanded by DOE2 and out-coupled to the user's eye by DOE3.

Green lower central component is in-coupled to the waveguide by DOE1, on which the part of it, which propagates in air at an angle different from the angle of incidence of blue component, diffracts, then is expanded by DOE2 and out-coupled to the user's eye by DOE3.

Red lower central component is in-coupled to the waveguide by DOE1, on which the part of it, which propagates in air at an angle different from the angle of incidence of blue component and green component, diffracts, then is expanded by DOE2 and out-coupled to the user's eye by DOE3.

Set 2 of waveguide I, comprising elements DOE2, DOE1 and DOE3, works as follows.

Blue upper central component is in-coupled to the waveguide by DOE2, then is expanded by DOE1 and out-coupled to the user's eye by DOE3.

Green upper central component is in-coupled to the waveguide by DOE2, on which the part of it, which propagates in air at an angle different from the angle of incidence of blue component, diffracts, then is expanded by DOE1 and out-coupled to the user's eye by DOE3.

Red upper central component is in-coupled to the waveguide by DOE2, on which the part of it, which propagates in air at an angle different from the angle of incidence of blue component and green component, diffracts, then is expanded by DOE1 and out-coupled to the user's eye by DOE3.

Set 3 of waveguide I, comprising elements DOE3, DOE4 and DOE5, works as follows.

Blue lower component is in-coupled to the waveguide by DOE3, then is expanded by DOE4 and out-coupled to the user's eye by DOE5.

Green lower component is in-coupled to the waveguide by DOE3, on which the part of it, which propagates in air at an angle different from the angle of incidence of blue component, diffracts, then is expanded by DOE4 and out-coupled to the user's eye by DOE5.

Red lower component is in-coupled to the waveguide by DOE3, on which the part of it, which propagates in air at an angle different from the angle of incidence of blue component and green component, diffracts, then is expanded by DOE4 and out-coupled to the user's eye by DOE5.

Set 4 of waveguide I, comprising elements DOE3, DOE5 and DOE4, works as follows.

Blue upper component is in-coupled to the waveguide by DOE3, then is expanded by DOE5 and out-coupled to the user's eye by DOE4.

Green upper component is in-coupled to the waveguide by DOE3, on which the part of it, which propagates in air at an angle different from the angle of incidence of blue component, diffracts, then is expanded by DOE5 and out-coupled to the user's eye by DOE4.

Red upper component is in-coupled to the waveguide by DOE3, on which the part of it, which propagates in air at an angle different from the angle of incidence of blue component and green component, diffracts, then is expanded by DOE5 and out-coupled to the user's eye by DOE4.

Then light from the projector falls on waveguide II in the light in-coupling zone, where it diffracts at diffraction elements DOE1, DOE2, and DOE3, and is also divided at different angles into red, green, and blue components. Outer part of blue field of view, central outer part of green field of view, and central outer part of red field of view are passed through waveguide II.

Set 1 of waveguide II, comprising elements DOE1, DOE2 and DOE3, operates as follows.

Blue lower central component is in-coupled to the waveguide by DOE1, then is expanded by DOE2 and out-coupled to the user's eye by DOE3.

Green lower central component is in-coupled to the waveguide by DOE1, on which the part of it, which propagates in air at an angle different from the angle of incidence of blue component, diffracts, then is expanded by DOE2 and out-coupled to the user's eye by DOE3.

Red lower central component is in-coupled to the waveguide by DOE1, on which the part of it, which propagates in air at an angle different from the angle of incidence of blue component and green component, diffracts, then is expanded by DOE2 and out-coupled to the user's eye by DOE3.

Set 2 of waveguide II, comprising elements DOE2, DOE1 and DOE3, operates as follows.

Blue upper central component is in-coupled to the waveguide by DOE2, then is expanded by DOE1 and out-coupled to the user's eye by DOE3.

Green upper central component is in-coupled to the waveguide by DOE2, on which the part of it, which propagates in air at an angle different from the angle of incidence of blue component, diffracts, then is expanded by DOE1 and out-coupled to the user's eye by DOE3.

Red upper central component is in-coupled to the waveguide by DOE2, on which the part of it, which propagates in air at an angle different from the angle of incidence of blue component and green component, diffracts, then is expanded by DOE1 and out-coupled to the user's eye by DOE3.

Set 3 of waveguide II, comprising elements DOE3, DOE4 and DOE5, operates as follows.

Blue lower component is in-coupled to the waveguide by DOE3, then is expanded by DOE4 and out-coupled to the user's eye by DOE5.

Green lower component is in-coupled to the waveguide by DOE3, on which the part of it, which propagates in air at an angle different from the angle of incidence of blue component, diffracts, then is expanded by DOE4 and out-coupled to the user's eye by DOE5.

Red lower component is in-coupled to the waveguide by DOE3, on which the part of it, which propagates in air at an angle different from the angle of incidence of blue component and green component, diffracts, then is expanded by DOE4 and out-coupled to the user's eye by DOE5.

Set 4 of waveguide II, comprising elements DOE3, DOE5 and DOE4, operates as follows.

Blue upper component is in-coupled to the waveguide by DOE3, then is expanded by DOE5 and out-coupled to the user's eye by DOE4.

Green upper component is in-coupled to the waveguide by DOE3, on which the part of it, which propagates in air at an angle different from the angle of incidence of blue component, diffracts, then is expanded by DOE5 and out-coupled to the user's eye by DOE4.

Red upper component is in-coupled to the waveguide by DOE3, on which the part of it, which propagates in air at an angle different from the angle of incidence of blue component and green component, diffracts, then is expanded by DOE5 and out-coupled to the user's eye by DOE4.

To transmit a full-color field of view without dips and losses in a two-waveguide system, fields of view of two separate waveguides are to be aligned as follows. Outer edge of the first waveguide red field of view should be spliced with inner edge of the second waveguide red field of view. In this case, green and blue fields will also be aligned without dips. With this, the full-color outer edge of the two-waveguide system field of view is determined by outer edge of the second waveguide red field of view, and the full-color inner edge of the two-waveguide system field of view is determined by inner edge of the first waveguide blue field of view.

Figure 10:
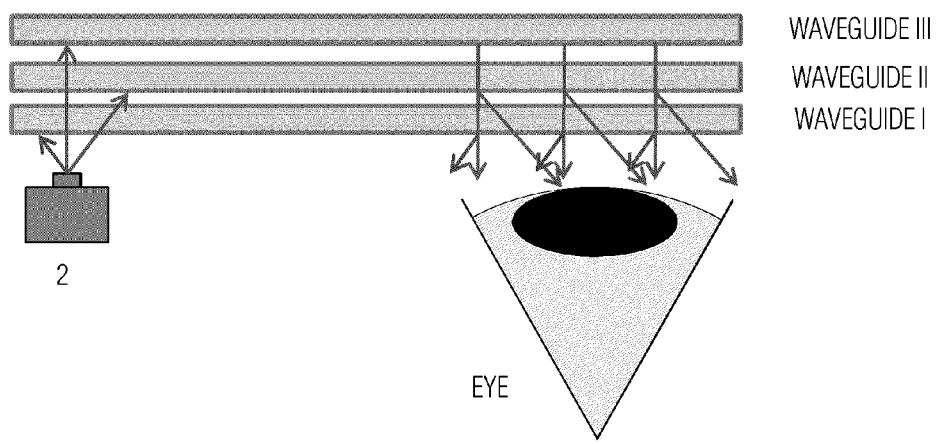
FIG. 10 illustrates a three-waveguide system according to an embodiment of the disclosure.

FIG. 10 shows the use of a three-waveguide system that operates as follows according to an embodiment of the disclosure.

Referring to FIG. 10, light from a projector 2 falls on waveguide I at the light in-coupling zone, where it diffracts on diffraction elements DOE1, DOE2, and DOE3, and is also divided at different angles into red, green and blue components. Inner part of the blue field of view, outermost inner part of the green field of view and outermost inner part of the red field of view are transmitted through waveguide I.

Set 1 of waveguide I, comprising elements DOE1, DOE2 and DOE3, operates as follows.

Blue lower central component is in-coupled to the waveguide by DOE1, then is expanded by DOE2 and out-coupled to the user's eye by DOE3.

Green lower central component is in-coupled to the waveguide by DOE1, on which the part of it, which propagates in air at an angle different from the angle of incidence of blue component, diffracts, then is expanded by DOE2 and out-coupled to the user's eye by DOE3.

Red lower central component is in-coupled to the waveguide by DOE1, on which the part of it, which propagates in air at an angle different from the angle of incidence of blue component and green component, diffracts, then is expanded by DOE2 and out-coupled to the user's eye by DOE3.

Set 2 of waveguide I, comprising elements DOE2, DOE1 and DOE3, operates as follows.

Blue upper central component is in-coupled to the waveguide by DOE2, then is expanded by DOE1 and out-coupled to the user's eye by DOE3.

Green upper central component is in-coupled to the waveguide by DOE2, on which the part of it, which propagates in air at an angle different from the angle of incidence of blue component, diffracts, then is expanded by DOE1 and out-coupled to the user's eye by DOE3.

Red upper central component is in-coupled to the waveguide by DOE2, on which the part of it, which propagates in air at an angle different from the angle of incidence of blue component and green component, diffracts, then is expanded by DOE1 and out-coupled to the user's eye by DOE3.

Set 3 of waveguide I, comprising elements DOE3, DOE4 and DOE5, operates as follows.

Blue lower component is in-coupled to the waveguide by DOE3, then is expanded by DOE4 and out-coupled to the user's eye by DOE5.

Green lower component is in-coupled to the waveguide by DOE3, on which the part of it, which propagates in air at an angle different from the angle of incidence of blue component, diffracts, then is expanded by DOE4 and out-coupled to the user's eye by DOE5.

Red lower component is in-coupled to the waveguide by DOE3, on which the part of it, which propagates in air at an angle different from the angle of incidence of blue component and green component, diffracts, then is expanded by DOE4 and out-coupled to the user's eye by DOE5.

Set 4 of waveguide I, comprising elements DOE3, DOE5 and DOE4, operates as follows.

Blue upper component is in-coupled to the waveguide by DOE3, then is expanded by DOE5 and out-coupled to the user's eye by DOE4.

Green upper component is in-coupled to the waveguide by DOE3, on which the part of it, which propagates in air at an angle different from the angle of incidence of blue component, diffracts, then is expanded by DOE5 and out-coupled to the user's eye by DOE4.

Red upper component is in-coupled to the waveguide by DOE3, on which the part of it, which propagates in air at an angle different from the angle of incidence of blue component and green component, diffracts, then is expanded by DOE5 and out-coupled to the user's eye by DOE4.

Then light from the projector 2 falls on waveguide II in the light in-coupling zone, where it diffracts on diffraction elements DOE1, DOE2 and DOE3, and is also divided at different angles into red, green and blue components. Central part of blue field of view, central inner part of green field of view and inner part of red field of view are passed through waveguide II.

Set 1 of waveguide II, comprising elements DOE1, DOE2 and DOE3, operates as follows.

Blue lower central component is in-coupled to the waveguide by DOE1, then is expanded by DOE2 and out-coupled to the user's eye by DOE3.

Green lower central component is in-coupled to the waveguide by DOE1, on which the part of it, which propagates in air at an angle different from the angle of incidence of blue component, diffracts, then is expanded by DOE2 and out-coupled to the user's eye by DOE3.

Red lower central component is in-coupled to the waveguide by DOE1, on which the part of it, which propagates in air at an angle different from the angle of incidence of blue component and green component, diffracts, then is expanded by DOE2 and out-coupled to the user's eye by DOE3.

Set 2 of waveguide II, comprising elements DOE2, DOE1 and DOE3, operates as follows.

Blue upper central component is in-coupled to the waveguide by DOE2, then is expanded by DOE1 and out-coupled to the user's eye by DOE3.

Green upper central component is in-coupled to the waveguide by DOE2, on which the part of it, which propagates in air at an angle different from the angle of incidence of blue component, diffracts, then is expanded by DOE1 and out-coupled to the user's eye by DOE3.

Red upper central component is in-coupled to the waveguide by DOE2, on which the part of it, which propagates in air at an angle different from the angle of incidence of blue component and green component, diffracts, then is expanded by DOE1 and out-coupled to the user's eye by DOE3.

Set 3 of waveguide II, comprising elements DOE3, DOE4 and DOE5, operates as follows.

Blue lower component is in-coupled to the waveguide by DOE3, then is expanded by DOE4 and out-coupled to the user's eye by DOE5.

Green lower component is in-coupled to the waveguide by DOE3, on which the part of it, which propagates in air at an angle different from the angle of incidence of blue component, diffracts, then is expanded by DOE4 and out-coupled to the user's eye by DOE5.

Red lower component is in-coupled to the waveguide by DOE3, on which the part of it, which propagates in air at an angle different from the angle of incidence of blue component and green component, diffracts, then is expanded by DOE4 and out-coupled to the user's eye by DOE5.

Set 4 of waveguide II, comprising elements DOE3, DOE5 and DOE4, operates as follows.

Blue upper component is in-coupled to the waveguide by DOE3, then is expanded by DOE5 and out-coupled to the user's eye by DOE4.

Green upper component is in-coupled to the waveguide by DOE3, on which the part of it, which propagates in air at an angle different from the angle of incidence of blue component, diffracts, then is expanded by DOE5 and out-coupled to the user's eye by DOE4.

Red upper component is in-coupled to the waveguide by DOE3, on which the part of it, which propagates in air at an angle different from the angle of incidence of blue component and green component, diffracts, then is expanded by DOE5 and out-coupled to the user's eye by DOE4.

Then, light from the projector 2 falls on the waveguide III B the light in-coupling zone, where it diffracts on diffraction elements DOE1, DOE2 and DOE3, and is also divided at different angles into red, green and blue components. Outer part of blue field of view, outer part of green field of view and central outer part of red field of view are passed through waveguide III.

Set 1 of waveguide III, comprising elements DOE1, DOE2 and DOE3, operates as follows.

Blue lower central component is in-coupled to the waveguide by DOE1, then is expanded by DOE2 and out-coupled to the user's eye by DOE3.

Green lower central component is in-coupled to the waveguide by DOE1, on which the part of it, which propagates in air at an angle different from the angle of incidence of blue component, diffracts, then is expanded by DOE2 and out-coupled to the user's eye by DOE3.

Red lower central component is in-coupled to the waveguide by DOE1, on which the part of it, which propagates in air at an angle different from the angle of incidence of blue component and green component, diffracts, then is expanded by DOE2 and out-coupled to the user's eye by DOE3.

Set 2 of waveguide III, comprising elements DOE2, DOE1 and DOE3, operates as follows.

Blue upper central component is in-coupled to the waveguide by DOE2, then is expanded by DOE1 and out-coupled to the user's eye by DOE3.

Green upper central component is in-coupled to the waveguide by DOE2, on which the part of it, which propagates in air at an angle different from the angle of incidence of blue component, diffracts, then is expanded by DOE1 and out-coupled to the user's eye by DOE3.

Red upper central component is in-coupled to the waveguide by DOE2, on which the part of it, which propagates in air at an angle different from the angle of incidence of blue component and green component, diffracts, then is expanded by DOE1 and out-coupled to the user's eye by DOE3.

Set 3 of waveguide III, comprising elements DOE3, DOE4 and DOE5, operates as follows.

Blue lower component is in-coupled to the waveguide by DOE3, then is expanded by DOE4 and out-coupled to the user's eye by DOE5.

Green lower component is in-coupled to the waveguide by DOE3, on which the part of it, which propagates in air at an angle different from the angle of incidence of blue component, diffracts, then is expanded by DOE4 and out-coupled to the user's eye by DOE5.

Red lower component is in-coupled to the waveguide by DOE3, on which the part of it, which propagates in air at an angle different from the angle of incidence of blue component and green component, diffracts, then is expanded by DOE4 and out-coupled to the user's eye by DOE5.

Set 4 of waveguide III, comprising elements DOE3, DOE5 and DOE4, operates as follows.

Blue upper component is in-coupled to the waveguide by DOE3, then is expanded by DOE5 and out-coupled to the user's eye by DOE4.

Green upper component is in-coupled to the waveguide by DOE3, on which the part of it, which propagates in air at an angle different from the angle of incidence of blue component, diffracts, then is expanded by DOE5 and out-coupled to the user's eye by DOE4.

Red upper component is in-coupled to the waveguide by DOE3, on which the part of it, which propagates in air at an angle different from the angle of incidence of blue component and green component, diffracts, then is expanded by DOE5 and out-coupled to the user's eye by DOE4.

To transmit a full-color field of view without dips in a three-waveguide system, outer edge of the first waveguide red field of view should be spliced with inner edge of the second waveguide red field of view, and outer edge of the second waveguide red field of view should be spliced with inner edge of the third waveguide red field of view. In this case, green and blue fields of view will also be aligned without dips. With this, the full-color outer edge of the field of view of the three-waveguide system is determined by outer edge of the third waveguide red field of view, and the full-color inner edge of the field of view of the three-waveguide system is determined by inner edge of the first waveguide blue field of view.

Figure 11:
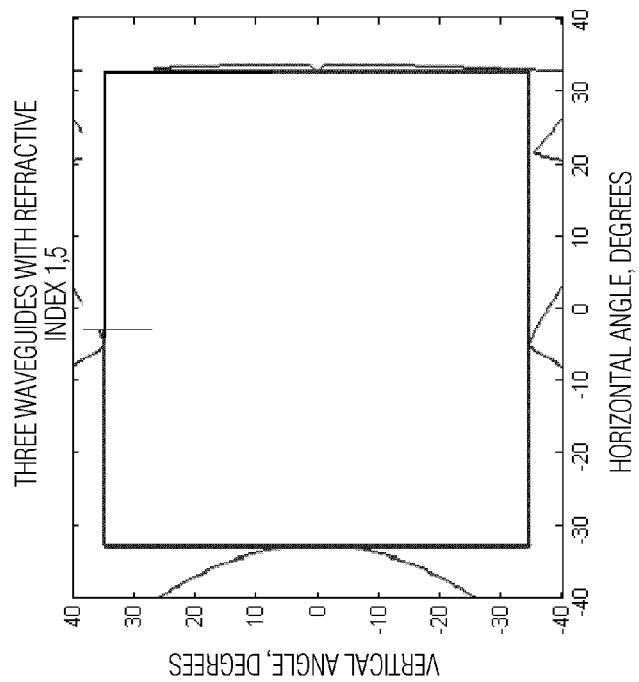
FIG. 11 shows plots demonstrating sizes of a field of view of a two-waveguide system with refractive index 1.7 (a) and a three-waveguide system with refractive index 1.5 (b) according to an embodiment of the disclosure.
Figure 11:
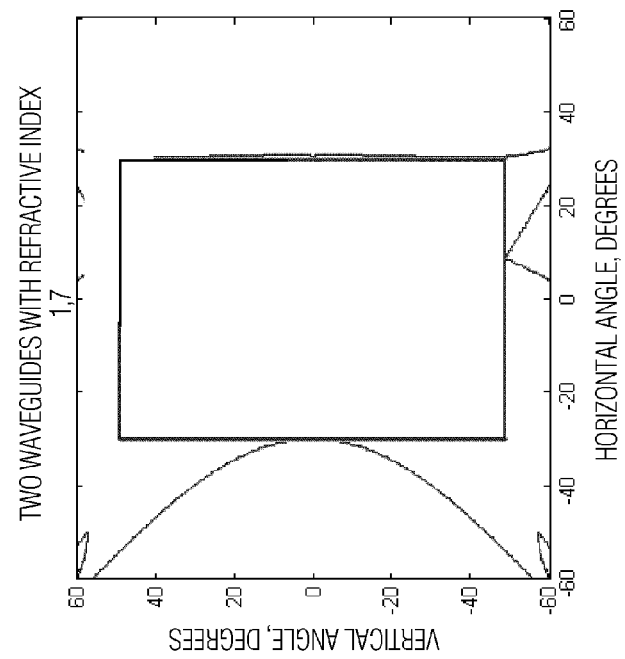

FIG. 11 depicts plots showing sizes of a field of view of a two-waveguide system with refractive index 1.7 (a) and a three-waveguide system with refractive index 1.5 (b) according to an embodiment of the disclosure.

X-axis stands for horizontal field of view, and Y-axis stands for vertical field of view, provided that the in-coupling zone of the waveguides is on a side (right or left, but not above or below) of the eye. Curved lines show edges of the field of view drawn through the system. Rectangle marks maximum rectangular field of view that can be obtained using this system. Using a three-waveguide system with refractive index 1.5, rectangular field of view of 65 degrees in horizontal and 69 degrees in vertical can be obtained, diagonal field of view of the system is 86 degrees, which exceeds the field of view of related art systems, and satisfies market requirements (>80 degrees). Using a two-waveguide system with refractive index 1.7, rectangular field of view of 60 degrees in horizontal and 98 degrees in vertical can be obtained, diagonal field of view of the system is 104 degrees, which also exceeds the field of view of related art systems and satisfies market requirements, while using fewer waveguides. This is because increasing the refractive index of the waveguide increases the range of angles that can be transmitted by a single waveguide, thereby increasing the resulting field of view of the entire system. Vertical field of view increases more than horizontal one, since four sets of gratings in each waveguide are responsible for increasing the vertical field of view, while increasing the horizontal field of view in this disclosure is provided only by increasing the number of waveguides.

Figure 12:
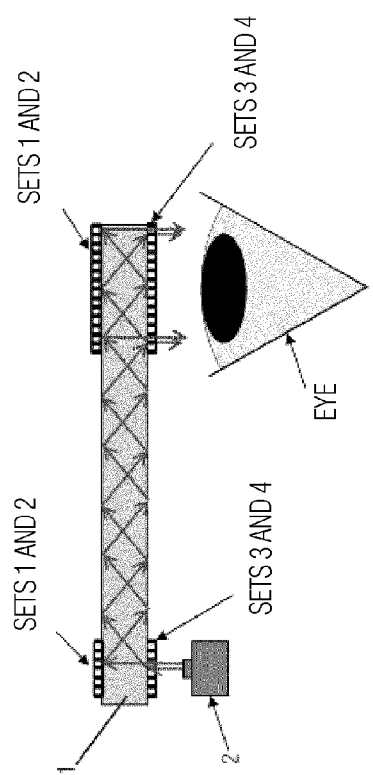
FIG. 12 shows an arrangement of architectures of diffractive elements on opposite sides of one waveguide according to an embodiment of the disclosure.

FIG. 12 shows that waveguide architectures can be applied to opposite sides of one waveguide according to an embodiment of the disclosure.

For example, sets 1 and 2 of diffractive elements can be provided on one side of the waveguide, and sets 3 and 4 of diffractive elements can be provided on the other side of the waveguide. The ease of manufacture depends on the number of diffraction gratings overlaid on each other. In the related art, two gratings overlaid on one side of a waveguide are easy to manufacture, while three overlaid gratings are an order of magnitude more difficult to produce.

Referring to FIG. 12 ensures that there are no more than two overlaid gratings on one side of the waveguide.

Figure 13:
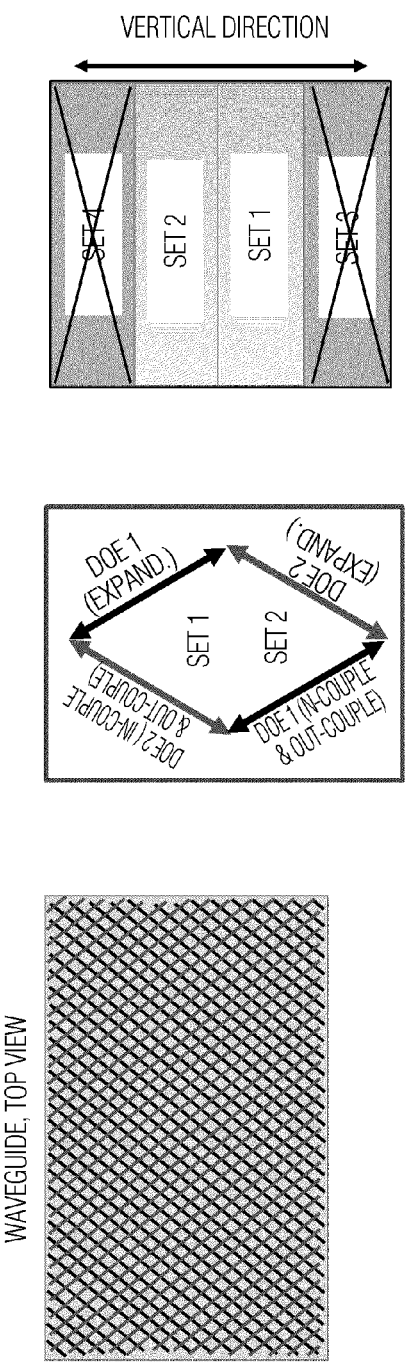
FIG. 13 shows a waveguide architecture comprising set 1 and set 2 of diffractive elements according to an embodiment of the disclosure.

FIG. 13 shows a waveguide architecture comprising set 1 and set 2 of diffractive elements according to an embodiment of the disclosure.

Referring to FIG. 13, in one embodiment, only set 1 of diffractive elements and set 2 of diffractive elements can be used. Moreover, it is proposed to exclude DOE3 from sets 1 and 2, assigning its function to DOE1 and DOE2. That is, as shown in FIG. 13, set 1 in this embodiment consists of DOE2 performing the light in-couple and out-couple function, and DOE1 performing the light expand function, while set 2 in this embodiment consists of DOE1 performing the light in-couple and out-couple function, and DOE2 performing the light expand function. These two sets will transmit only two central parts of the field of view.

In this case, light from the projector falls on the waveguide at the light in-coupling zone, where it diffracts on diffraction elements DOE1, DOE2, and is also divided at different angles into red, green, and blue components.

Set 1, comprising elements DOE1 and DOE2, operates as follows.

Blue lower central component is in-coupled to the waveguide by DOE1, then is expanded by DOE2, re-diffracted at DOE2 and out-coupled to the user's eye by DOE1.

Green lower central component is in-coupled to the waveguide by DOE1, on which the part of it, which propagates in air at an angle different from the angle of incidence of blue component, diffracts, then is expanded by DOE2, re-diffracted at DOE2 and out-coupled to the user's eye by DOE1.

Red lower central component is in-coupled to the waveguide by DOE1, on which the part of it, which propagates in air at an angle different from the angle of incidence of blue component and green component, diffracts, then is expanded by DOE2, re-diffracted by DOE2 and out-coupled to the user's eye by DOE1.

Set 2, comprising elements DOE2 and DOE1, operates as follows.

Blue upper central component is in-coupled to the waveguide by DOE2, then is expanded by DOE1, re-diffracted by DOE1 and out-coupled to the user's eye by DOE2.

Green upper central component is in-coupled to the waveguide by DOE2, on which the part of it, which propagates in air at an angle different from the angle of incidence of blue component, diffracts, then is expanded by DOE1, re-diffracted by DOE1 and out-coupled to the user's eye by DOE2.

Red upper central component is in-coupled to the waveguide by DOE2, on which the part of it, which propagates in air at an angle different from the angle of incidence of blue component and green component, diffracts, then is expanded by DOE1, re-diffracted by DOE1 and out-coupled to the user's eye by DOE2.

Diffraction gratings can be applied to the waveguide using traditional methods and may have a homogeneous structure, that is, the diffraction gratings will have the same profile and the form of lines will not change over the entire diffraction grating area. Diffraction gratings can have a segmented structure, that is, lines can be formed as macro-segments of different shape, different size, and spaced apart from each other at different distance. Diffraction gratings can be volume, i.e., with lines located inside the waveguide volume or a layer adjacent to the waveguide. Also, diffraction gratings can be formed as surface structures, relief structures, or mixed structures, that is, both relief and volume. Diffraction gratings can be formed as part of the waveguide, either in the waveguide volume, or on the waveguide surface, or a mixed version (both in volume and on the surface). Diffraction gratings can be formed in a separate layer of the waveguide, either inside or on the surface of this layer, or mixed, i.e., part inside, part on the surface.

Diffractive elements can be holographic diffractive elements (HOE). Such elements are produced by holographic beam recording. According to the disclosure, HOE can be recorded by three laser beams. Three coherent beams create an interference pattern comprising three linear sinusoidal images, whose orientations and periods can be controlled by angles between corresponding beams. The three beams do not lie in the same plane, but instead each pair of beams forms its own plane. In this case, the interference pattern that will be produced by the three beams is the sum of three two-beam interferences. By changing angles between beams 1, 2, 3, it is possible to change both orientation of the HOE, i.e., the angle between gratings lines relative to each other and the waveguide, and the period of lines of diffraction gratings. With this recording method, only one holographic recording operation enables recording three diffraction gratings at once, which will form two sets of diffraction gratings, that is, two recording operations can completely produce the waveguide architecture. For example, sets of 1 and 2 can be formed in a first recording operation, and sets 3 and 4 can be formed in a second recording operation.

Diffraction gratings can be produced by holographic copying technique. For that purpose, a master waveguide, i.e., a waveguide with recorded architecture of diffractive elements, should be used. The master waveguide is aligned with an empty waveguide, and the master waveguide is illuminated; the light falling on diffractive optical elements of the master waveguide diffracts on the master waveguide. The transmitted diffracted beams interfere with each other, forming the same gratings inside the recording material on the second waveguide, thus, the master waveguide is copied.

Initial characteristics of the master waveguide include refractive index of the waveguide, size of the waveguide, and parameters of the architecture to be produced, such as the field-of-view width, the distance at which the user will observe the image, etc.

The disclosure enables using a single waveguide in an augmented reality device, thereby reducing thickness of the device, its size and weight, and increasing transparency of the augmented reality device. Furthermore, the augmented reality device provides full-color image with high resolution and good brightness. Also, the disclosure ensures a large field of view, providing the user with an immersive presence.

The disclosure can be used for manufacture of augmented reality displays, which can comprise at least one waveguide having any one of the present diffractive optical elements-based architectures.

The disclosure can be used for the manufacture of augmented reality glasses. The disclosure is conveniently applied in augmented reality glasses, for which low weight and small size are important. The disclosure can be conveniently applied in augmented reality devices used for any purpose.

Augmented reality glasses comprise a left eye element and a right eye element, each of the left eye and right eye elements comprising the augmented reality display device, wherein the waveguide including the diffractive optical elements-based architecture is located in each of the right eye and left eye elements such that the out-coupling diffractive element is opposite the user's eye.

Although the disclosure has been described in connection with some illustrative embodiments, it should be understood the disclosure is not limited to these specific embodiments. On the contrary, it is assumed that the disclosure includes all alternatives, corrections, and equivalents that may be included within the essence and scope of the claims.

Further, the disclosure retains all equivalents of the claimed disclosure even if the claims are amended during prosecution.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A waveguide with a diffractive optical elements-based architecture for an augmented reality device, the waveguide comprising:
    a light in-coupling zone;
    a light expanding zone;
    a light out-coupling zone;
    a first in-coupling/expanding diffractive optical element configured to in-couple light and expand light;
    a second in-coupling/expanding diffractive optical element configured to in-couple light and expand light;
    an in-coupling/out-coupling diffractive optical element configured to in-couple light and out-couple light;
    a first expanding/out-coupling diffractive optical element configured to expand light and out-couple light; and
    a second expanding/out-coupling diffractive optical element configured to expand light and out-couple light,
    wherein the light in-coupling zone comprises the first in-coupling/expanding diffractive optical element performing a light in-couple function, the second in-coupling/expanding diffractive optical element performing the light in-couple function, and the in-coupling/out-coupling diffractive optical element performing the light in-couple function,
    wherein the light expanding zone comprises the second in-coupling/expanding diffractive optical element performing a light expand function, the first in-coupling/expanding diffractive optical element performing the light expand function, the first expanding/out-coupling diffractive optical element performing the light expand function, and the second expanding/out-coupling diffractive optical element performing the light expand function, and
    wherein the light out-coupling zone comprises the in-coupling/out-coupling diffractive optical element performing a light out-couple function, the second expanding/out-coupling diffractive optical element performing the light out-couple function, and the first expanding/out-coupling diffractive optical element performing the light out-couple function.

2. The waveguide of claim 1,
    wherein the light in-coupling zone, in operation of the augmented reality device, is configured to divide an image from a projector into red, green, and blue color image components and guide beam paths of the color image components through a respective set of diffractive optical elements, and
    wherein the waveguide, along a path of light, comprises:
        a first set of diffractive optical elements comprising:
            the first in-coupling/expanding diffractive optical element performing the light in-couple function,
            the second in-coupling/expanding diffractive optical element performing the light expand function, and
            the in-coupling/out-coupling diffractive optical element performing the light out-couple function;
        a second set of diffractive optical elements comprising:
            the second in-coupling/expanding diffractive optical element performing the light in-couple function,
            the first in-coupling/expanding diffractive optical element performing the light expand function, and the in-coupling/out-coupling diffractive optical element performing the light out-couple function;
a third set of diffractive optical elements comprising:
the in-coupling/out-coupling diffractive optical element performing the light in-couple function,
the first expanding/out-coupling diffractive optical element performing the light expand function, and
the second expanding/out-coupling diffractive optical element performing the light out-couple function; and
a fourth set of diffractive optical elements comprising:
the in-coupling/out-coupling diffractive optical element performing the light in-couple function,
the second expanding/out-coupling diffractive optical element performing the light expand function, and
the first expanding/out-coupling diffractive optical element performing the light out-couple function.

3. The waveguide of claim 2, wherein a sum of vectors of all diffractive optical elements in each set is zero.

4. The waveguide of claim 3, wherein each diffractive optical element is linear.

5. The waveguide of claim 2,
wherein the first set of diffractive optical elements and the second set of diffractive optical elements are configured to transmit a central part of a field of view,
wherein the third set of diffractive optical elements is configured to transmit an upper part of the field of view, and
wherein the fourth set of diffractive optical elements is configured to transmit a lower part of the field of view.

6. The waveguide of claim 1, wherein the diffractive optical elements are applied to one side of the waveguide.

7. The waveguide of claim 1, wherein the diffractive optical elements comprise a segmented structure in which lines are formed as macro-segments of different shapes, different sizes, and spaced apart from each other at different distances.

8. The waveguide of claim 1, wherein the diffractive optical elements comprise a volume in which lines are located inside a volume of the waveguide or a layer adjacent to the waveguide.

9. The waveguide of claim 1, wherein the diffractive optical elements comprise one of a surface structure, a relief structure, or mixed structure having both the relief structure and a volume.

10. The waveguide of claim 1, wherein the diffractive optical elements are formed either in a waveguide volume, on a waveguide surface, or both in the waveguide volume and on the waveguide surface.

11. The waveguide of claim 1, wherein the diffractive optical elements are formed in a separate layer of the waveguide that is inside of a layer, on a surface of the layer, or mixed in which part is inside of the layer and part is on the surface of the layer.

12. The waveguide of claim 1, wherein the diffractive optical elements are holographic.

13. An augmented reality display device comprising:
an image projector; and
the waveguide of claim 1.

14. Augmented reality glasses comprising a left eye element and a right eye element, each of the left eye element and the right eye element comprising the augmented reality display device of claim 13,
wherein the waveguide is arranged in each of the left eye element and right eye element so that light is out-coupled to a user's eyes.

15. The waveguide of claim 1, wherein each diffractive optical element performs two separate functions.

16. The waveguide of claim 2,
wherein vectors of each set of diffractive optical elements comprise a shape of an enclosed two-dimensional figure, and
wherein vectors of the first, second, third, and fourth sets are arranged in four triangles, respectively.

17. The waveguide of claim 2,
wherein the first set and the second set of diffractive elements are disposed on a first side of the waveguide, and
wherein the third set and the fourth set of diffractive elements are disposed on a second side of the waveguide opposite to the first side of the waveguide.

18. A method of operating a waveguide with a diffractive optical elements-based architecture for an augmented reality device, the method comprising:
receiving light from a projector and directing the light into a light in-coupling zone;
dividing the light into a red color image component, a blue color image component, and a green color image component; and
guiding the light to sets of diffractive optical elements operating simultaneously,
wherein a first set of diffractive optical elements performs:
in-coupling a blue lower central component to the waveguide by a first in-coupling/expanding diffractive optical element, expanding the blue lower central component by a second in-coupling/expanding diffractive optical element, and out-coupling the blue lower central component to a user's eye by an in-coupling/out-coupling diffractive optical element;
in-coupling a green lower central component to the waveguide by the first in-coupling/expanding diffractive optical element, a part of the green lower central component propagating at an angle different from an angle of incidence of the blue lower central component being diffracted, expanding the green lower central component by the second in-coupling/expanding diffractive optical element, and out-coupling the green lower central component to the user's eye by the in-coupling/out-coupling diffractive optical element; and
in-coupling a red lower central component to the waveguide by the first in-coupling/expanding diffractive optical element, a part of the red lower central component propagating at an angle different from the angle of incidence of the blue lower central component and an angle of incidence of the green lower central component being diffracted, expanding the red lower central component by the second in-coupling/expanding diffractive optical element, and out-coupling the red lower central component to the user's eye by the in-coupling/out-coupling diffractive optical element,
wherein a second set of diffractive optical elements performs:
in-coupling a blue upper central component to the waveguide by the second in-coupling/expanding diffractive optical element, expanding the blue upper central component by the second in-coupling/expanding diffractive optical element, and out-coupling to the user's eye by the in-coupling/out-coupling diffractive optical element;

in-coupling a green upper central component to the waveguide by the second in-coupling/expanding diffractive optical element, a part of the green upper central component propagating at an angle different from an angle of incidence of the blue upper central component being diffracted, expanding the green upper central component by the second in-coupling/expanding diffractive optical element, and out-coupling the green upper central component to the user's eye by the in-coupling/out-coupling diffractive optical element; and in-coupling a red upper central component to the waveguide by the second in-coupling/expanding diffractive optical element, a part of the red upper central component propagating at an angle different from the angle of incidence of the blue upper central component and an angle of incidence of the green upper central component being diffracted expanding the red upper central component by the second in-coupling/expanding diffractive optical element, and out-coupling the red upper central component to the user's eye by the in-coupling/out-coupling diffractive optical element, wherein a third set of diffractive elements performs:

in-coupling a blue lower component to the waveguide by the in-coupling/out-coupling diffractive optical element, expanding the blue lower component by a first expanding/out-coupling diffractive optical element, and out-coupling the blue lower component to the user's eye by a second expanding/out-coupling diffractive optical element;

in-coupling a green lower component to the waveguide by the in-coupling/out-coupling diffractive optical element, a part of the green lower component propagating at an angle different from an angle of incidence of the blue lower component being diffracted expanding the green lower component by the first expanding/out-coupling diffractive optical element, and out-coupling the green lower component to the user's eye by the second expanding/out-coupling diffractive optical element; and in-coupling a red lower component to the waveguide by the in-coupling/out-coupling diffractive optical element, a part of the red lower component propagating at an angle different from the angle of incidence of the blue lower component and an angle of incidence of the green lower component being diffracted, expanding the red lower component by the first expanding/out-coupling diffractive optical element, and out-coupling the red lower component to the user's eye by the second expanding/out-coupling diffractive optical element, and wherein a fourth set of diffractive elements performs:

in coupling a blue upper component to the waveguide by the in-coupling/out-coupling diffractive optical element, expanding the blue upper component by the second expanding/out-coupling diffractive optical element, and out-coupling the blue upper component to the user's eye by the first expanding/out-coupling diffractive optical element;

in-coupling a green upper component to the waveguide by the in-coupling/out-coupling diffractive optical element, a part of the green upper component propagating at an angle different from an angle of incidence of the blue upper component being diffracted, expanding the green upper component by the second expanding/out-coupling diffractive optical element, and out-coupling the green upper component to the user's eye by the first expanding/out-coupling diffractive optical element; and in-coupling a red upper component to the waveguide by the in-coupling/out-coupling diffractive optical element, a part of the red upper component propagating at an angle different from the angle of incidence of the blue upper component and an angle of incidence of the green upper component being diffracted, expanding the red upper component by the second expanding/out-coupling diffractive optical element, and out-coupling the red upper component to the user's eye by the first expanding/out-coupling diffractive optical element.

* * * * *